United States Patent
Gass et al.

(10) Patent No.: US 9,878,380 B2
(45) Date of Patent: Jan. 30, 2018

(54) TABLE SAW THROAT PLATES AND TABLE SAWS INCLUDING THE SAME

(71) Applicant: SD3, LLC, Tualatin, OR (US)

(72) Inventors: Stephen F. Gass, West Linn, OR (US); J. David Fulmer, West Linn, OR (US); David A. Fanning, Vancouver, WA (US)

(73) Assignee: SawStop Holding LLC, Tualatin, OR (US)

( * ) Notice: Subject to any disclaimer, the term of this patent is extended or adjusted under 35 U.S.C. 154(b) by 0 days.

(21) Appl. No.: 15/362,388

(22) Filed: Nov. 28, 2016

(65) Prior Publication Data

US 2017/0072481 A1 Mar. 16, 2017

Related U.S. Application Data

(60) Continuation of application No. 12/806,829, filed on Aug. 20, 2010, now Pat. No. 9,522,476, which is a
(Continued)

(51) Int. Cl.
*B27B 27/00* (2006.01)
*B27B 5/29* (2006.01)
(Continued)

(52) U.S. Cl.
CPC ........... *B23D 47/025* (2013.01); *B23D 47/08* (2013.01); *B23D 59/001* (2013.01); *B26D 7/24* (2013.01);
(Continued)

(58) Field of Classification Search
CPC ... B23D 47/025; Y10T 83/95; Y10T 83/7734; Y10T 83/773; Y10T 83/7726; Y10T 83/7697; Y10T 83/732
(Continued)

(56) References Cited

U.S. PATENT DOCUMENTS 1,552,665 A 9/1925 Herschel
1,816,069 A 7/1931 Bennett
(Continued)

FOREIGN PATENT DOCUMENTS

DE 4205965 C1 2/1992
DE 4424615 A1 1/1996
(Continued)

OTHER PUBLICATIONS

SI16WA-WF Circular Saw with Tilting Blade Spare Parts Catalogue, SCMI Corporation, Norcross, GA, Nov. 1986 and 1991.
(Continued)

*Primary Examiner* — Ghassem Alie

(57) ABSTRACT

Throat plates for table saws and table saws are disclosed. In some embodiments, the throat plates and/or saws have at least one securement mechanism to secure and prevent inadvertent removal of the throat plate from the throat of the saw. In some embodiments, at least one of the securement mechanisms also provides a height adjustment mechanism and/or prevents vertical removal of the throat plate. In some embodiments, the throat plate has an accessory mounting port that provides a portal for accessories, including safety accessories, to extend through the plate from beneath the table of the saw. In some embodiments, the port extends from the plate's outer perimeter to divide the plate's rear end portion into a pair of spaced-apart members. In some embodiments, these members are independently secured to the table saw and retained apart from each other by one or more of the securement mechanisms.

16 Claims, 10 Drawing Sheets

Related U.S. Application Data continuation of application No. 11/796,819, filed on Apr. 30, 2007, now Pat. No. 8,079,292, which is a division of application No. 09/929,426, filed on Aug. 13, 2001, now Pat. No. 7,210,383, said application No. 12/806,829 is a continuation of application No. 12/655,695, filed on Jan. 4, 2010, now Pat. No. 8,006,595, which is a continuation of application No. 11/975,985, filed on Oct. 22, 2007, now Pat. No. 7,640,835, which is a continuation of application No. 09/929,221, filed on Aug. 13, 2001, now Pat. No. 7,284,467, said application No. 12/806,829 is a continuation of application No. 12/002,388, filed on Dec. 17, 2007, now Pat. No. 8,011,279, which is a continuation of application No. 09/929,227, filed on Aug. 13, 2001, now Pat. No. 7,308,843, said application No. 12/806,829 is a continuation of application No. 11/401,050, filed on Apr. 10, 2006, now Pat. No. 7,788,999, which is a continuation of application No. 09/929,240, filed on Aug. 13, 2001, now Pat. No. 7,100,483, and a continuation of application No. 09/929,241, filed on Aug. 13, 2001, now Pat. No. 7,024,975, and a continuation of application No. 09/929,425, filed on Aug. 13, 2001, now Pat. No. 7,137,326, and a continuation of application No. 10/172,553, filed on Jun. 13, 2002, now Pat. No. 7,231,856, and a continuation of application No. 10/189,027, filed on Jul. 2, 2002, now Pat. No. 7,712,403, and a continuation of application No. 10/243,042, filed on Sep. 13, 2002, now Pat. No. 7,197,969, and a continuation of application No. 10/643,296, filed on Aug. 18, 2003, now abandoned, and a continuation of application No. 10/794,161, filed on Mar. 4, 2004, now Pat. No. 7,098,800, said application No. 12/806,829 is a continuation of application No. 12/800,607, filed on May 19, 2010, now Pat. No. 7,895,927, which is a continuation of application No. 11/542,938, filed on Oct. 2, 2006, now abandoned, which is a continuation of application No. 10/984,643, filed on Nov. 8, 2004, now Pat. No. 8,061,245, which is a continuation of application No. 09/929,226, filed on Aug. 13, 2001, now Pat. No. 6,920,814, said application No. 10/984,643 is a continuation of application No. 09/929,240, filed on Aug. 13, 2001, now Pat. No. 7,100,483, and a continuation of application No. 09/929,242, filed on Aug. 13, 2001, now Pat. No. 7,509,899, and a continuation of application No. 10/051,782, filed on Jan. 15, 2002, now Pat. No. 6,877,410, and a continuation of application No. 10/052,806, filed on Jan. 16, 2002, now Pat. No. 6,880,440, and a continuation of application No. 10/205,164, filed on Jul. 25, 2002, now Pat. No. 6,945,149, and a continuation of application No. 10/202,928, filed on Jul. 25, 2002, now Pat. No. 7,000,514, and a continuation of application No. 10/785,361, filed on Feb. 23, 2004, now Pat. No. 6,997,090, which is a continuation of application No. 10/215,929, filed on Aug. 9, 2002, now abandoned, said application No. 12/806,829 is a continuation of application No. 11/542,938, filed on Oct. 2, 2006, now abandoned, which is a continuation of application No. 09/929,242, filed on Aug. 13, 2001, now Pat. No. 7,509,899, said application No. 11/542,938 is a continuation of application No. 11/401,774, filed on Apr. 11, 2006, now Pat. No. 7,525,055, which is a continuation of application No. 11/027,322, filed on Dec. 31, 2004, now abandoned, said application No. 11/542,938 is a continuation of application No. 11/445,548, filed on Jun. 2, 2006, now Pat. No. 7,347,131, and a continuation of application No. 11/506,260, filed on Aug. 18, 2006, now Pat. No. 7,359,174, which is a continuation of application No. 10/923,282, filed on Aug. 20, 2004, now abandoned, said application No. 12/806,829 is a continuation of application No. 12/590,094, filed on Nov. 2, 2009, now Pat. No. 7,958,806, which is a continuation of application No. 09/929,236, filed on Aug. 13, 2001, now Pat. No. 7,610,836, said application No. 12/806,829 is a continuation of application No. 11/811,719, filed on Jun. 11, 2007, now Pat. No. 7,832,314, which is a continuation of application No. 11/061,162, filed on Feb. 18, 2005, now Pat. No. 7,228,772, which is a continuation of application No. 09/929,244, filed on Aug. 13, 2001, now Pat. No. 6,857,345, said application No. 12/806,829 is a continuation of application No. 12/587,695, filed on Oct. 9, 2009, now Pat. No. 7,921,754, which is a continuation of application No. 09/929,237, filed on Aug. 13, 2001, now Pat. No. 7,600,455, said application No. 12/806,829 is a continuation of application No. 12/661,766, filed on Mar. 22, 2010, now Pat. No. 8,051,759, which is a continuation of application No. 11/810,196, filed on Jun. 4, 2007, now Pat. No. 7,681,479, which is a continuation of application No. 09/929,234, filed on Aug. 13, 2001, now Pat. No. 7,225,712, said application No. 12/806,829 is a continuation of application No. 12/655,694, filed on Jan. 4, 2010, now Pat. No. 7,908,950, which is a continuation of application No. 12/079,836, filed on Mar. 27, 2008, now Pat. No. 7,640,837, which is a division of application No. 09/929,235, filed on Aug. 13, 2001, now Pat. No. 7,350,444, said application No. 12/806,829 is a continuation of application No. 12/799,211, filed on Apr. 19, 2010, now Pat. No. 8,100,039, which is a continuation of application No. 12/220,946, filed on Jul. 29, 2008, now Pat. No. 7,698,976, which is a continuation of application No. 09/929,238, filed on Aug. 13, 2001, now abandoned, said application No. 12/806,829 is a continuation of application No. 12/590,924, filed on Nov. 16, 2009, now Pat. No. 8,186,255, which is a division of application No. 12/154,675, filed on May 23, 2008, now Pat. No. 7,617,752, which is a division of application No. 10/053,390, filed on Jan. 16, 2002, now Pat. No. 7,377,199, which is a continuation-in-part of application No. 09/676,190, filed on Sep. 29, 2000, now Pat. No. 7,055,417, said application No. 12/806,829 is a continuation of application No. 12/313,162, filed on Nov. 17, 2008, now Pat. No. 7,789,002, which is a continuation of application No. 11/348,580, filed on Feb. 6, 2006, now abandoned, which is a continuation of application No. 10/052,705, filed on Jan. 16, 2002, now Pat. No. 6,994,004, said application No. 12/313, 162 is a continuation of application No. 11/098,984, filed on Apr. 4, 2005, now Pat. No. 7,353,737, which is a continuation of application No. 09/929,238, filed on Aug. 13, 2001, now abandoned, and a continuation of application No. 10/047,066, filed on Jan. 14, 2002, now Pat. No. 6,945,148, and a continuation of application No. 10/051,782, filed on Jan. 15, 2002, now Pat. No. 6,877,410, said application No. 12/806,829 is a continuation of application No. 12/661,993, filed on Mar. 26, 2010, now Pat. No. 8,061,246, which is a continuation of application No. 11/982,972, filed on Nov. 5, 2007, now Pat. No. 7,685,912, which is a continuation of application No. 10/932,339, filed on Sep. 1, 2004, now Pat. No. 7,290,472, which is a continuation of application No. 10/047,066, filed on Jan. 14, 2002, now Pat. No. 6,945,148, and a continuation of application No. 10/932,339, which is a continuation of application No. 10/050,085, filed on Jan. 14, 2002, now abandoned, said application No. 12/806,829 is a continuation of application No. 10/100,211, filed on Mar. 13, 2002, now Pat. No. 9,724,840, and a continuation of application No. 11/256,757, filed on Oct. 24, 2005, now Pat. No. 8,065,943, which is a continuation of application No. 09/955,418, filed on Sep. 17, 2001, now Pat. No. 6,957,601, said application No. 12/806,829 is a continuation of application No. 10/146,527, filed on May 15, 2002, and a continuation of application No. 12/586,469, filed on Sep. 21, 2009, now abandoned, which is a division of application No. 11/702,330, filed on Feb. 5, 2007, now Pat. No. 7,591,210, which is a continuation of application No. 10/189,031, filed on Jul. 2, 2002, now Pat. No. 7,171,879, said application No. 12/806,829 is a continuation of application No. 11/208,214, filed on Aug. 19, 2005, now Pat. No. 7,784,507, which is a continuation of application No. 10/251,576, filed on Sep. 20, 2002, now abandoned, which is a continuation-in-part of application No. 10/197,975, filed on Jul. 18, 2002, now abandoned, said application No. 11/208,214 is a continuation-in-part of application No. 09/676,190, filed on Sep. 29, 2000, now Pat. No. 7,055,417, said application No. 12/806,829 is a continuation of application No. 12/231,080, filed on Aug. 29, 2008, now Pat. No. 7,900,541, which is a continuation of application No. 11/487,717, filed on Jul. 17, 2006, now Pat. No. 7,421,315, which is a continuation of application No. 10/292,607, filed on Nov. 12, 2002, now Pat. No. 7,077,039, said application No. 12/806,829 is a continuation of application No. 12/655,962, filed on Jan. 11, 2010, now abandoned, which is a continuation of application No. 12/313,277, filed on Nov. 17, 2008, now Pat. No. 7,644,645, which is a continuation of application No. 10/345,630, filed on Jan. 15, 2003, now abandoned, said application No. 12/806,829 is a continuation of application No. 12/658,759, filed on Feb. 12, 2010, now abandoned, which is a continuation of application No. 11/787,471, filed on Apr. 17, 2007, now Pat. No. 7,661,343, which is a continuation of application No. 10/341,260, filed on Jan. 13, 2003, now abandoned, said application No. 12/806,829 is a continuation of application No. 11/647,676, filed on Dec. 29, 2006, now Pat. No. 7,836,804, which is a continuation-in-part of application No. 10/923,290, filed on Aug. 20, 2004, now Pat. No. 7,472,634, said application No. 12/806,829 is a continuation of application No. 12/079,820, filed on Mar. 27, 2008, now Pat. No. 7,845,258, which is a division of application No. 10/923,273, filed on Aug. 20, 2004, now Pat. No. 7,350,445, said application No. 12/806,829 is a continuation of application No. 12/454,569, filed on May 18, 2009, now Pat. No. 7,991,503, which is a continuation of application No. 11/027,600, filed on Dec. 31, 2004, now Pat. No. 7,536,238, said application No. 12/806,829 is a continuation of application No. 12/799,915, filed on May 3, 2010, now Pat. No. 8,087,438, which is a continuation of application No. 12/322,069, filed on Jan. 26, 2009, now Pat. No. 7,707,918, which is a continuation of application No. 11/107,499, filed on Apr. 15, 2005, now Pat. No. 7,481,140, said application No. 12/806,829 is a continuation of application No. 12/077,576, filed on Mar. 19, 2008, now abandoned, which is a continuation of application No. 11/027,254, filed on Dec. 31, 2004, now abandoned, said application No. 12/806,829 is a continuation of application No. 12/799,920, filed on May 3, 2010, now Pat. No. 8,122,807, which is a continuation of application No. 11/026,114, filed on Dec. 31, 2004, now Pat. No. 7,707,920, said application No. 12/806,829 is a continuation of application No. 11/026,006, filed on Dec. 31, 2004, now Pat. No. 8,459,157, said application No. 12/806,829 is a continuation of application No. 11/045,972, filed on Jan. 28, 2005, now Pat. No. 7,827,890, said application No. 12/806,829 is a continuation of application No. 12/454,730, filed on May 20, 2009, now Pat. No. 7,997,176, which is a continuation of application No. 11/395,502, filed on Mar. 31, 2006, now abandoned.

(60) Provisional application No. 60/225,200, filed on Aug. 14, 2000, provisional application No. 60/225,211, filed on Aug. 14, 2000, provisional application No. 60/225,170, filed on Aug. 14, 2000, provisional application No. 60/225,056, filed on Aug. 14, 2000, provisional application No. 60/225,169, filed on Aug. 14, 2000, provisional application No. 60/225,210, filed on Aug. 14, 2000, provisional application No. 60/298,207, filed on Jun. 13, 2001, provisional application No. 60/302,916, filed on Jul. 3, 2001, provisional application No. 60/324,729, filed on Sep. 24, 2001, provisional application No. 60/406,138, filed on Aug. 27, 2002, provisional application No. 60/452,159, filed on Mar. 5, 2003, provisional application No. 60/225,206, filed on Aug. 14, 2000, provisional application No. 60/225,089, filed on Aug. 14, 2000, provisional application No. 60/279,313, filed on Mar. 27, 2001, provisional application No. 60/270,942, filed on Feb. 22, 2001, provisional application No. 60/307,756, filed on Jul. 25, 2001, provisional application No. 60/308,492, filed on Jul. 27, 2001, provisional application No. 60/312,141, filed on Aug. 13, 2001, provisional application No. 60/533,598, filed on Dec. 31, 2003, provisional application No. 60/496,568, filed on Aug. 20, 2003, provisional application No. 60/225,201, filed on Aug. 14, 2000, provisional application No. 60/225,212, filed on Aug. 14, 2000, provisional application No. 60/225,059, filed on Aug. 14, 2000, provisional application No. 60/225,094, filed on Aug. 14, 2000, provisional application No. 60/225,058, filed on Aug. 14, 2000, provisional application No. 60/225,057, filed on Aug. 14, 2000, provisional application No. 60/270,011, filed on Feb. 20, 2001, provisional application No. 60/270,941, filed on Feb. 22, 2001, provisional application No. 60/270,942, filed on Feb. 22, 2001, provisional application No. 60/273,177, filed on Mar. 2, 2001, provisional application No.

60/273,178, filed on Mar. 2, 2001, provisional application No. 60/667,485, filed on Mar. 31, 2005, provisional application No. 60/273,902, filed on Mar. 6, 2001, provisional application No. 60/275,583, filed on Mar. 13, 2001, provisional application No. 60/233,459, filed on Sep. 18, 2000, provisional application No. 60/275,594, filed on Mar. 13, 2001, provisional application No. 60/275,595, filed on Mar. 13, 2001, provisional application No. 60/292,081, filed on May 17, 2001, provisional application No. 60/292,100, filed on May 17, 2001, provisional application No. 60/302,937, filed on Jul. 2, 2001, provisional application No. 60/306,202, filed on Jul. 18, 2001, provisional application No. 60/292,010, filed on May 17, 2001, provisional application No. 60/323,975, filed on Sep. 21, 2001, provisional application No. 60/157,340, filed on Oct. 1, 1999, provisional application No. 60/182,866, filed on Feb. 16, 2000, provisional application No. 60/335,970, filed on Nov. 13, 2001, provisional application No. 60/349,989, filed on Jan. 16, 2002, provisional application No. 60/351,797, filed on Jan. 25, 2002, provisional application No. 60/496,550, filed on Aug. 20, 2003, provisional application No. 60/496,574, filed on Aug. 20, 2003, provisional application No. 60/533,791, filed on Dec. 31, 2003, provisional application No. 60/533,852, filed on Dec. 31, 2003, provisional application No. 60/533,811, filed on Dec. 31, 2003, provisional application No. 60/533,575, filed on Dec. 31, 2003, provisional application No. 60/540,377, filed on Jan. 29, 2004.

(51) Int. Cl.

| | | |
|---|---|---|
| *B23D 47/02* | (2006.01) | |
| *B23D 47/08* | (2006.01) | |
| *B23D 59/00* | (2006.01) | |
| *B27B 5/38* | (2006.01) | |
| *B27B 13/14* | (2006.01) | |
| *B27G 19/00* | (2006.01) | |
| *B27G 19/02* | (2006.01) | |
| *F16P 3/12* | (2006.01) | |
| *F16P 3/14* | (2006.01) | |
| *B26D 7/24* | (2006.01) | |
| *B27G 19/06* | (2006.01) | |

(52) U.S. Cl.
CPC ............... *B27B 5/38* (2013.01); *B27B 13/14* (2013.01); *B27G 19/00* (2013.01); *B27G 19/02* (2013.01); *B27G 19/06* (2013.01); *F16P 3/12* (2013.01); *F16P 3/14* (2013.01); *F16P 3/148* (2013.01); *Y10S 83/01* (2013.01); *Y10T 83/04* (2015.04); *Y10T 83/081* (2015.04); *Y10T 83/088* (2015.04); *Y10T 83/089* (2015.04); *Y10T 83/091* (2015.04); *Y10T 83/141* (2015.04); *Y10T 83/162* (2015.04); *Y10T 83/175* (2015.04); *Y10T 83/178* (2015.04); *Y10T 83/541* (2015.04); *Y10T 83/613* (2015.04); *Y10T 83/7693* (2015.04); *Y10T 83/7697* (2015.04); *Y10T 83/7726* (2015.04); *Y10T 83/7734* (2015.04); *Y10T 83/7788* (2015.04); *Y10T 83/85* (2015.04); *Y10T 83/8773* (2015.04)

(58) Field of Classification Search
USPC ... 83/471.3, 581, 471.1, 477.1, 698.51, 472, 83/473, 477, 468.7, 466, 52, 2.18, 477.2, 83/478, 440.2; 144/1.1, 286.1, 286.5; 220/3.5; 295/57, 25, 256.5; 403/405.1, 403/408.1, 409.1
See application file for complete search history.

(56) References Cited

U.S. PATENT DOCUMENTS

| | | | |
|---|---|---|---|
| 2,008,673 A | 7/1935 | Ocenasek | |
| 2,020,222 A * | 11/1935 | Tautz | B23D 47/025 269/309 |
| 2,044,481 A | 6/1936 | Manley | |
| 2,054,932 A | 9/1936 | Fleming | |
| RE20,687 E | 4/1938 | Grozier | |
| 2,236,232 A | 3/1941 | Brescka | |
| 2,593,596 A | 4/1952 | Olson | |
| 2,711,061 A | 6/1955 | Fegert | |
| 2,984,268 A | 5/1961 | Vuichard | |
| 3,007,501 A | 11/1961 | Mundell | |
| 3,289,713 A | 12/1966 | Herzog | |
| 3,444,670 A | 5/1969 | Hungate | |
| 3,581,784 A * | 6/1971 | Warrick | B23D 45/068 83/477.1 |
| 4,063,478 A | 12/1977 | Stuy | |
| 4,241,505 A | 12/1980 | Bodycomb et al. | |
| 4,255,995 A | 3/1981 | Connor | |
| 4,326,864 A | 4/1982 | Sittler | |
| 4,367,665 A | 1/1983 | Terpstra et al. | |
| 4,385,539 A | 5/1983 | Meyerhoefer et al. | |
| 4,576,072 A | 3/1986 | Terpstra et al. | |
| 4,721,023 A | 1/1988 | Bartlett et al. | |
| 4,742,743 A | 5/1988 | Scrapone | |
| 4,875,398 A | 10/1989 | Taylor et al. | |
| 5,033,192 A | 7/1991 | Franz et al. | |
| 5,123,317 A | 6/1992 | Barnes, Jr. et al. | |
| 5,158,001 A | 10/1992 | Udelhofen et al. | |
| 5,159,864 A * | 11/1992 | Wedemeyer | B23D 47/025 83/13 |
| 5,181,447 A | 1/1993 | Hewitt | |
| 5,231,906 A | 8/1993 | Kogej | |
| 5,398,740 A | 3/1995 | Miller | |
| 5,537,748 A | 7/1996 | Takahashi et al. | |
| 5,588,213 A | 12/1996 | Swanberg | |
| 5,675,895 A | 10/1997 | Mori et al. | |
| 5,857,507 A | 1/1999 | Puzio et al. | |
| 5,970,835 A | 10/1999 | Kenyon et al. | |
| 6,009,782 A | 1/2000 | Tajima et al. | |
| 6,058,819 A | 5/2000 | Binder et al. | |
| 6,076,445 A * | 6/2000 | Kenyon | B23D 47/025 144/1.1 |
| 6,131,629 A | 10/2000 | Puzio et al. | |
| 6,139,411 A | 10/2000 | Everts et al. | |
| 6,370,997 B1 | 4/2002 | Rugen et al. | |
| 6,405,624 B2 * | 6/2002 | Sutton | B27G 19/02 83/102.1 |
| 6,418,829 B1 * | 7/2002 | Pilchowski | B23D 59/001 83/397 |
| 6,470,778 B1 | 10/2002 | Kaye, Jr. et al. | |
| 6,510,772 B2 | 1/2003 | Brickner, Jr. et al. | |
| 6,530,303 B1 | 3/2003 | Parks et al. | |
| 6,736,042 B2 | 5/2004 | Behne et al. | |
| 6,796,208 B1 | 9/2004 | Jorgensen | |
| 6,840,144 B2 | 1/2005 | Huang | |
| 6,942,229 B2 | 9/2005 | Brazell et al. | |
| 6,966,350 B1 | 11/2005 | Gist | |
| 7,134,373 B1 * | 11/2006 | Vice | B23D 47/025 83/471.2 |
| 7,210,386 B1 | 5/2007 | Chang | |
| 7,241,211 B2 | 7/2007 | Baratta | |
| 7,721,633 B2 | 5/2010 | Gaw | |
| 7,980,163 B2 | 7/2011 | Meredith et al. | |
| 8,082,826 B2 | 12/2011 | Keller et al. | |
| 2001/0035081 A1 | 11/2001 | Sutton | |
| 2004/0159200 A1 | 8/2004 | Stoffel | |
| 2004/0255745 A1 | 12/2004 | Peot et al. | |
| 2005/0188806 A1 | 9/2005 | Garcia et al. | |
| 2005/0204883 A1 | 9/2005 | Huang | |
| 2006/0219076 A1 | 10/2006 | Gass et al. | |

(56) References Cited

U.S. PATENT DOCUMENTS

| | | |
|---|---|---|
| 2007/0157784 A1 | 7/2007 | Gass et al. |
| 2010/0307308 A1 | 12/2010 | Butler |
| 2011/0057374 A1 | 3/2011 | Liu |
| 2011/0179923 A1 | 7/2011 | Tsuda et al. |
| 2012/0036972 A1 | 2/2012 | Frolov |
| 2012/0090440 A1 | 4/2012 | Koegel et al. |

FOREIGN PATENT DOCUMENTS

| | | |
|---|---|---|
| DE | 202004004463 U1 | 8/2004 |
| EP | 1527848 A2 | 5/2005 |
| EP | 2277651 A2 | 1/2011 |
| WO | WO 2004/045814 A1 | 6/2004 |

OTHER PUBLICATIONS

Inca 2100SE Professional Tablesaw Owners Manual, Injecta Machinery, 1992.
Inca 2200 Table Saw Photo of Internal Mechanisms, around 1992.
Skil Model 3400—Type 1 10" Table Saw Parts List and Technical Bulletin, S-B Power Tool Company, Jun. 1993.
Shop Fox® Fence Operating Manual, Woodstock International, Inc., 1996, revised May 1997.
SI320 Circular with Tilting Blade Spare Parts Catalogue, SCM, Dec. 23, 1998.
SI3200/3800 Circular with Tilting Blade Spare Parts Catalogue, SCM, Dec. 23, 1998.
Grizzly Industrial, Inc. Heavy-Duty 12" Table Saw Model G5959 and G9957 Parts List, 1998 and Oct. 2001.
SC 3W Circular Saw Manual, SCM Group S.p.A Divisione Minimax—Samco, Feb. 2001.
Bosch 10" Table Saw Model 0601476139 Parts List and Technical Bulletin, S-B Power Tool Company, Apr. 2001.
SI450E Circular with Tilting Blade Spare Parts Catalogue, SCM, Apr. 26, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Ryobi 10" Table Saw BT3100 Operator's Manual, Ryobi Technologies, Inc., Aug. 2002.
Rojek KPF 300A-xxxxx-RN-1P3 Table Saw/Shaper Combination Machine specification sheet, Sep. 30, 2002.
The Merlin Splitter by Excalibur a Sommerville Design Product Overview & Generic Installation Notes, Sommerville Design & Manufacturing Inc., at least as early as 2002.
Rojek Circular Saw PK 300 Spare part catalogue, Apr. 14, 2003.
Ridgid TS3650 Operators Manual 10" Cast Iron Table Saw, May 2003, Jun. 2003 and Jul. 15, 2003.
Porter-Cable Double Insulated 10" Bench Top Table Saw Instruction Manual, Porter-Cable Corporation, Sep. 15, 2003.
SI300S-SI300S4 Circular with Tilting Blade Spare Parts Catalogue, SCM, Oct. 30, 2003.
Delta Biesemeyer 10" Table Saw Blade Guard Systems Instruction Manual, Delta Machinery, May 9, 2005.
Powermatic WMH Tool Group Operating Instructions and Parts Manual 10-inch Cabinet Saw Model 2000, Nov. 2005.
Makita Model 2704 Exploded Drawings and Parts List, Nov. 2005.
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
SI300N Circular with Tilting Blade Spare Parts Catalogue, SCM, Jun. 12, 2000.
Bosch Model 4000 Worksite Table Saw Operating/Safety Instructions, S-B Power Tool Company, Jul. 2000.
Two photographs of a saw displayed at a trade show on Aug. 23, 2000.
SI400N Circular with Tilting Blade Spare Parts Catalogue, SCM, Sep. 19, 2000.
DeWalt Woodworker's Table Saw DW746 Instruction Manual, DeWalt Industrial Tool Co., 2000.
Ryobi 10" Table Saw BT3000 Operator's Manual, Ryobi Technologies, Inc., Mar. 2001.
Porter-Cable 10" Portable Table Saw 3812, Porter-Cable Corporation, 2005.
Porter Cable 10" Portable Table Saw Model 3812 Parts List with Guard Exploded View, 2005.
DW745 Type 1 Table Saw Parts List, DeWalt Industrial Tool Co., 2005.
Grizzly Industrial, Inc. Model G0605X/G0606X Extreme Series 12" Table Saw Owner's Manual, Grizzly Industrial, Inc., Oct. 2006.
DW745 Heavy-Duty 10" Job Site Table Saw Manual, DeWalt Industrial Tool Co., 2006.
C10RB Jobsite Table Saw Manual, Hitachi Koki USA Ltd., 2006.
TS 250 Manual, Metabo, 2007.
TS 250 Circular Saw Parts List, Metabo, 2007.
Bosch 4100 Table Saw Parts List, Robert Bosch Tool Corporation, Feb. 14, 2008.
Grizzly Industrial, Inc. Model G0651/G0652 10" Extreme Series Table Saws Owner's Manual, Grizzly Industrial, Inc., Mar. 2008.
Bosch 4100 Table Saw Manual, Robert Bosch Tool Corporation, May 2008.
Makita Table Saw 2704 Instruction Manual, Makita Corporation of America, date unknown.
SCM SI 450 Circular saw with tilting blade product brochure, Villa Verucchio, Italy, undated.
Powermatic, Accu-Fence for the Models 66, 72A & 74A Table Saws Instruction Manual & Parts List, undated.
SCM Group publication, Rimini, Italy, undated.
Laguna Tools table saw owner's manual, date unknown.

* cited by examiner

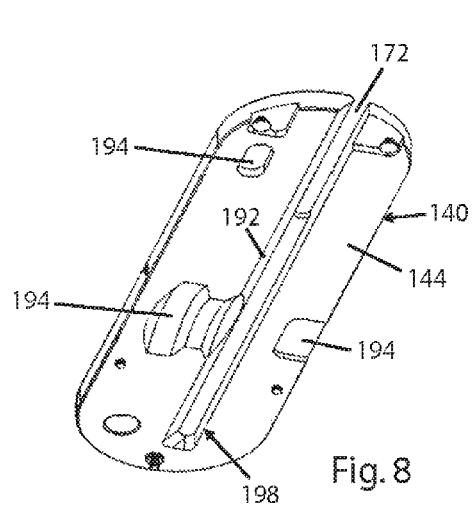
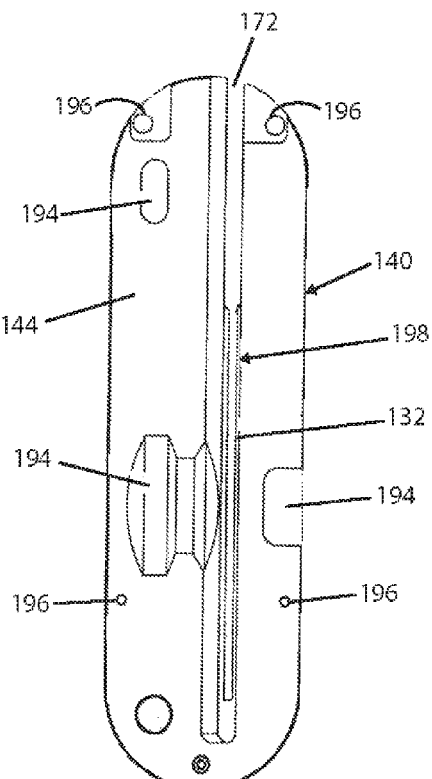
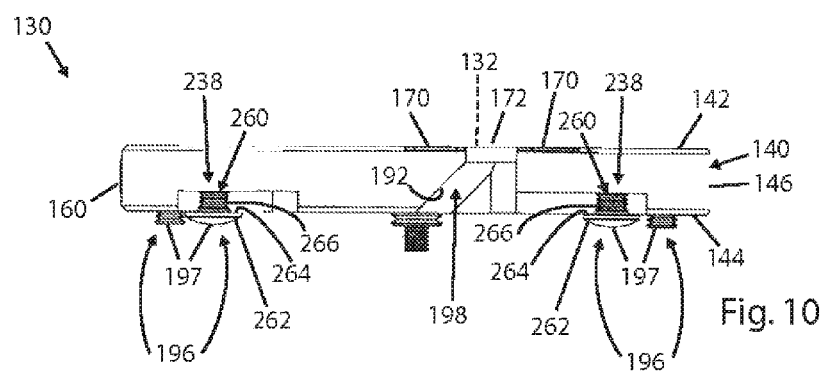

TABLE SAW THROAT PLATES AND TABLE SAWS INCLUDING THE SAME

CROSS-REFERENCE TO RELATED APPLICATIONS

This application is a continuation of the following U.S. patent applications, all of which are hereby incorporated by reference in their entireties:

Ser. No. 12/806,829, filed Aug. 20, 2010, which is a continuation of Ser. No. 11/796,819, filed Apr. 30, 2007, issuing as U.S. Pat. No. 8,079,292 on Dec. 20, 2011, which is a divisional continuation of Ser. No. 09/929,426, filed Aug. 13, 2001, issuing as U.S. Pat. No. 7,210,383 on May 1, 2007, which claims the benefit of and priority from a number of U.S. Provisional Patent Applications including Ser. No. 60/225,200, filed Aug. 14, 2000;

Ser. No. 12/806,829 is also a continuation of Ser. No. 12/655,695, filed Jan. 4, 2010, issuing as U.S. Pat. No. 8,006,595 on Aug. 30, 2011, which is a continuation of Ser. No. 11/975,985, filed Oct. 22, 2007, issuing as U.S. Pat. No. 7,640,835 on Jan. 5, 2010, which is a continuation of Ser. No. 09/929,221, filed Aug. 13, 2001, issuing as U.S. Pat. No. 7,284,467 on Oct. 23, 2007, which claims the benefit of and priority from a number of U.S. Provisional Patent Applications including Ser. No. 60/225,211, filed Aug. 14, 2000;

Ser. No. 12/806,829 is also a continuation of Ser. No. 12/002,388 filed Dec. 17, 2007, issuing as U.S. Pat. No. 8,011,279 on Sep. 6, 2011, which is a continuation of Ser. No. 09/929,227, filed Aug. 13, 2001, issuing as U.S. Pat. No. 7,308,843 on Dec. 18, 2007, which claims the benefit of and priority from a number of U.S. Provisional Patent Applications including Ser. No. 60/225,170, filed Aug. 14, 2000;

Ser. No. 12/806,829 is also a continuation of Ser. No. 11/401,050, filed Apr. 10, 2006, issuing as U.S. Pat. No. 7,788,999 on Sep. 7, 2010, which is a continuation of a number of applications including Ser. No. 09/929,240, filed Aug. 13, 2001, issuing as U.S. Pat. No. 7,100,483 on Sep. 5, 2006, which in turn claims the benefit of and priority from U.S. Provisional Patent Application Ser. No. 60/225,056, filed Aug. 14, 2000;

and Ser. No. 11/401,050 is also a continuation of Ser. No. 09/929,241, filed Aug. 13, 2001, issuing as U.S. Pat. No. 7,024,975 on Apr. 11, 2006, which in turn claims the benefit of and priority from a number of U.S. Provisional Patent Applications including Ser. No. 60/225,169, filed Aug. 14, 2000;

and Ser. No. 11/401,050 is also a continuation of Ser. No. 09/929,425, filed Aug. 13, 2001, issuing as U.S. Pat. No. 7,137,326 on Nov. 21, 2006, which in turn claims the benefit of and priority from U.S. Provisional Patent Application Ser. No. 60/225,210, filed Aug. 14, 2000;

and Ser. No. 11/401,050 is also a continuation of Ser. No. 10/172,553, filed Jun. 13, 2002, issuing as U.S. Pat. No. 7,231,856 on Jun. 19, 2007, which in turn claims the benefit of and priority from U.S. Provisional Patent Application Ser. No. 60/298,207, filed Jun. 13, 2001;

and Ser. No. 11/401,050 is also a continuation of Ser. No. 10/189,027, filed Jul. 2, 2002, issuing as U.S. Pat. No. 7,712,403 on May 11, 2010, which in turn claims the benefit of and priority from U.S. Provisional Patent Application Ser. No. 60/302,916, filed Jul. 3, 2001;

and Ser. No. 11/401,050 is also a continuation of Ser. No. 10/243,042, filed Sep. 13, 2002, issuing as U.S. Pat. No. 7,197,969 on Apr. 3, 2007, which in turn claims the benefit of and priority from U.S. Provisional Patent Application Ser. No. 60/324,729, filed Sep. 24, 2001;

and Ser. No. 11/401,050 is also a continuation of Ser. No. 10/643,296, filed Aug. 18, 2003, now abandoned, which in turn claims the benefit of and priority from U.S. Provisional Patent Application Ser. No. 60/406,138, filed Aug. 27, 2002;

and Ser. No. 11/401,050 is also a continuation of Ser. No. 10/794,161, filed Mar. 4, 2004, issuing as U.S. Pat. No. 7,098,800 on Aug. 29, 2006, which in turn claims the benefit of and priority from U.S. Provisional Patent Application Ser. No. 60/452,159, filed Mar. 5, 2003;

Ser. No. 12/806,829 is also a continuation of Ser. No. 12/800,607, filed May 19, 2010, issuing as U.S. Pat. No. 7,895,927 on Mar. 1, 2011, which is a continuation of a number of applications, including Ser. No. 11/542,938, filed Oct. 2, 2006, now abandoned, which in turn is a continuation of a number of applications, including Ser. No. 10/984,643, filed Nov. 8, 2004, issuing as U.S. Pat. No. 8,061,245 on Nov. 22, 2011, which also is a continuation of a number of applications, including Ser. No. 09/929,226, filed Aug. 13, 2001, issuing as U.S. Pat. No. 6,920,814 on Jul. 26, 2005, which in turn claims the benefit of and priority from U.S. Provisional Patent Application Ser. No. 60/225,206, filed Aug. 14, 2000;

and Ser. No. 10/984,643 is also a continuation of Ser. No. 09/929,240, filed Aug. 13, 2001, issuing as U.S. Pat. No. 7,100,483 on Sep. 5, 2006, which in turn claims the benefit of and priority from U.S. Provisional Patent Application Ser. No. 60/225,056, filed Aug. 14, 2000;

and Ser. No. 10/984,643 is also a continuation of Ser. No. 09/929,242, filed Aug. 13, 2001, issuing as U.S. Pat. No. 7,509,899 on Mar. 31, 2009, which claims the benefit of and priority from a number of U.S. Provisional Patent Applications including Ser. No. 60/225,089, filed Aug. 14, 2000;

and Ser. No. 10/984,643 is also a continuation of Ser. No. 10/051,782, filed Jan. 15, 2002, issuing as U.S. Pat. No. 6,877,410 on Apr. 12, 2005, which in turn claims the benefit of and priority from U.S. Provisional Patent Application Ser. No. 60/279,313, filed Mar. 27, 2001;

and Ser. No. 10/984,643 is also a continuation of Ser. No. 10/052,806, filed Jan. 16, 2002, issuing as U.S. Pat. No. 6,880,440 on Apr. 19, 2005, which in turn claims the benefit of and priority from U.S. Provisional Patent Application Ser. No. 60/270,942, filed Feb. 22, 2001;

and Ser. No. 10/984,643 is also a continuation of Ser. No. 10/205,164, filed Jul. 25, 2002, issuing as U.S. Pat. No. 6,945,149 on Sep. 20, 2005, which in turn claims the benefit of and priority from U.S. Provisional Patent Application Ser. No. 60/307,756, filed Jul. 25, 2001;

and Ser. No. 10/984,643 is also a continuation of Ser. No. 10/202,928, filed Jul. 25, 2002, issuing as U.S. Pat. No. 7,000,514 on Feb. 21, 2006, which in turn claims the benefit of and priority from U.S. Provisional Patent Application Ser. No. 60/308,492, filed Jul. 27, 2001;

and Ser. No. 10/984,643 is also a continuation of Ser. No. 10/785,361, filed Feb. 23, 2004, issuing as U.S. Pat. No. 6,997,090 on Feb. 14, 2006, which is a continuation of Ser. No. 10/215,929, filed Aug. 9, 2002, now abandoned, which in turn claims the benefit of and priority from U.S. Provisional Patent Application Ser. No. 60/312,141, filed Aug. 13, 2001;

Ser. No. 12/806,829 is also a continuation of Ser. No. 11/542,938, filed Oct. 2, 2006, now abandoned, which is a continuation of a number of applications, including Ser. No. 09/929,242, filed Aug. 13, 2001, issuing as U.S. Pat. No. 7,509,899 on Mar. 31, 2009, which claims the benefit of and priority from a number of U.S. Provisional Patent Applications including Ser. No. 60/225,089, filed Aug. 14, 2000;

and Ser. No. 11/542,938 is also a continuation of Ser. No. 11/401,774, filed Apr. 11, 2006, issuing as U.S. Pat. No. 7,525,055 on Apr. 28, 2009, which is a continuation of Ser. No. 11/027,322, filed Dec. 31, 2004, now abandoned, which claims the benefit of and priority from U.S. Provisional Patent Application Ser. No. 60/533,598, filed Dec. 31, 2003;

and Ser. No. 11/542,938 is also a continuation of Ser. No. 11/445,548, filed Jun. 2, 2006, issuing as U.S. Pat. No. 7,347,131 on Mar. 25, 2008;

and Ser. No. 11/542,938 is also a continuation of Ser. No. 11/506,260, filed Aug. 18, 2006, issuing as U.S. Pat. No. 7,359,174 on Apr. 15, 2008, which is a continuation of a number of application including Ser. No. 10/923,282, filed Aug. 20, 2004, now abandoned, which in turn claims the benefit of and priority from U.S. Provisional Patent Application Ser. No. 60/496,568, filed Aug. 20, 2003;

Ser. No. 12/806,829 is also a continuation of Ser. No. 12/590,094, filed Nov. 2, 2009, issuing as U.S. Pat. No. 7,958,806 on Jun. 14, 2011, which is a continuation of Ser. No. 09/929,236, filed Aug. 13, 2001, issuing as U.S. Pat. No. 7,610,836 on Nov. 3, 2009, which claims the benefit of and priority from a number of U.S. Provisional Patent Applications including Ser. No. 60/225,201, filed Aug. 14, 2000;

Ser. No. 12/806,829 is also a continuation of Ser. No. 11/811,719, filed Jun. 11, 2007, issuing as U.S. Pat. No. 7,832,314 on Nov. 16, 2010, which is a continuation of Ser. No. 11/061,162, filed Feb. 18, 2005, issuing as U.S. Pat. No. 7,228,772 on Jun. 12, 2007, which is a continuation of Ser. No. 09/929,244, filed Aug. 13, 2001, issuing as U.S. Pat. No. 6,857,345 on Feb. 22, 2005, which in turn claims the benefit of and priority from a number of U.S. Provisional Patent Applications including Ser. No. 60/225,212, filed Aug. 14, 2000;

Ser. No. 12/806,829 is also a continuation of Ser. No. 12/587,695, filed Oct. 9, 2009, issuing as U.S. Pat. No. 7,921,754 on Apr. 12, 2011, which is a continuation of Ser. No. 09/929,237, filed Aug. 13, 2001, issuing as U.S. Pat. No. 7,600,455 on Oct. 13, 2009, which claims the benefit of and priority from a number of U.S. Provisional Patent Applications including Ser. No. 60/225,059, filed Aug. 14, 2000;

Ser. No. 12/806,829 is also a continuation of Ser. No. 12/661,766, filed Mar. 22, 2010, issuing as U.S. Pat. No. 8,051,759 on Nov. 8, 2011, which is a continuation of Ser. No. 11/810,196, filed Jun. 4, 2007, issuing as U.S. Pat. No. 7,681,479 on Mar. 23, 2010, which is a continuation of Ser. No. 09/929,234, filed Aug. 13, 2001, issuing as U.S. Pat. No. 7,225,712 on Jun. 5, 2007, which claims the benefit of and priority from a number of U.S. Provisional Patent Applications including Ser. No. 60/225,094, filed Aug. 14, 2000;

Ser. No. 12/806,829 is also a continuation of Ser. No. 12/655,694, filed Jan. 4, 2010, issuing as U.S. Pat. No. 7,908,950 on Mar. 22, 2011, which is a continuation of Ser. No. 12/079,836, filed Mar. 27, 2008, issuing as U.S. Pat. No. 7,640,837 on Jan. 5, 2010, which is a divisional continuation of Ser. No. 09/929,235, filed Aug. 13, 2001, issuing as U.S. Pat. No. 7,350,444 on Apr. 1, 2008, which claims the benefit of and priority from a number of U.S. Provisional Patent Applications including Ser. No. 60/225,058, filed Aug. 14, 2000;

Ser. No. 12/806,829 is also a continuation of Ser. No. 12/799,211, filed Apr. 19, 2010, issuing as U.S. Pat. No. 8,100,039 on Jan. 24, 2012, which is a continuation of Ser. No. 12/220,946, filed Jul. 29, 2008, issuing as U.S. Pat. No. 7,698,976 on Apr. 20, 2010, which is a continuation of Ser. No. 09/929,238, filed Aug. 13, 2001, now abandoned, which claims the benefit of and priority from a number of U.S. Provisional Patent Applications including Ser. No. 60/225,057, filed Aug. 14, 2000;

Ser. No. 12/806,829 is also a continuation of Ser. No. 12/590,924, filed Nov. 16, 2009, issuing as U.S. Pat. No. 8,186,255 on May 29, 2012, which is a divisional continuation of Ser. No. 12/154,675, filed May 23, 2008, issuing as U.S. Pat. No. 7,617,752 on Nov. 17, 2009, which is a divisional continuation of Ser. No. 10/053,390, filed Jan. 16, 2002, issuing as U.S. Pat. No. 7,377,199 on May 27, 2008, which is a continuation-in-part of a number of applications including Ser. No. 09/676,190, filed Sep. 29, 2000, issuing as U.S. Pat. No. 7,055,417 on Jun. 6, 2006; and Ser. No. 10/053,390 also claims the benefit of and priority from U.S. Provisional Patent Application Ser. No. 60/270,011, filed Feb. 20, 2001;

Ser. No. 12/806,829 is also a continuation of Ser. No. 12/313,162, filed Nov. 17, 2008, issuing as U.S. Pat. No. 7,789,002 on Sep. 7, 2010, which is a continuation of Ser. No. 11/348,580, filed Feb. 6, 2006, now abandoned, which is a continuation of a number of applications including Ser. No. 10/052,705, filed Jan. 16, 2002, issuing as U.S. Pat. No. 6,994,004 on Feb. 7, 2006, which in turn claims the benefit of and priority from the following U.S. Provisional Patent Application Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, and Ser. No. 60/273,178, filed Mar. 2, 2001; and Ser. No. 11/348,580 also claims the benefit of and priority from U.S. Provisional Patent Application Ser. No. 60/667,485, filed Mar. 31, 2005; and Ser. No. 12/313,162 is also a continuation of Ser. No. 11/098,984, filed Apr. 4, 2005, issuing as U.S. Pat. No. 7,353,737 on Apr. 8, 2008, which is a continuation of Ser. No. 09/929,238, filed Aug. 13, 2001, now abandoned, Ser. No. 10/047,066, filed Jan. 14, 2002, issuing as U.S. Pat. No. 6,945,148 on Sep. 20, 2005, and Ser. No. 10/051,782, filed Jan. 15, 2002, issuing as U.S. Pat. No. 6,877,410 on Apr. 12, 2005;

Ser. No. 12/806,829 is also a continuation of Ser. No. 12/661,993, filed Mar. 26, 2010, issuing as U.S. Pat. No. 8,061,246 on Nov. 22, 2011, which is a continuation of Ser. No. 11/982,972, filed Nov. 5, 2007, issuing as U.S. Pat. No. 7,685,912 on Mar. 30, 2010, which is a continuation of Ser. No. 10/932,339, filed Sep. 1, 2004, issuing as U.S. Pat. No. 7,290,472 on Nov. 6, 2007, which is a continuation of Ser. No. 10/047,066, filed Jan. 14, 2002, issuing as U.S. Pat. No. 6,945,148 on Sep. 20, 2005, which in turn claims the benefit of and priority from the following U.S. Provisional Patent Application Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, and Ser. No. 60/273,902, filed Mar. 6, 2001; and Ser. No. 10/932,339 is also a continuation of Ser. No. 10/050,085, filed Jan. 14, 2002, now abandoned;

Ser. No. 12/806,829 is also a continuation of Ser. No. 10/100,211, filed Mar. 13, 2002, which claims the benefit of and priority from U.S. Provisional Patent Application Ser. No. 60/275,583, filed Mar. 13, 2001;

Ser. No. 12/806,829 is also a continuation of Ser. No. 11/256,757, filed Oct. 24, 2005, issuing as U.S. Pat. No. 8,065,943 on Nov. 29, 2011, which is a continuation of Ser. No. 09/955,418, filed Sep. 17, 2001, issuing as U.S. Pat. No. 6,957,601 on Oct. 25, 2005, which in turn claims the benefit of and priority to a number of U.S. Provisional Patent Applications, including: Ser. No. 60/233,459, filed Sep. 18, 2000, Ser. No. 60/270,011, filed Feb. 20, 2001, Ser. No.

60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, Ser. No. 60/273,902, filed Mar. 6, 2001, Ser. No. 60/275,594, filed Mar. 13, 2001, Ser. No. 60/275,595, filed Mar. 13, 2001, Ser. No. 60/279,313, filed Mar. 27, 2001, Ser. No. 60/292,081, filed May 17, 2001, Ser. No. 60/292,100, filed May 17, 2001, Ser. No. 60/298,207, filed Jun. 13, 2001, Ser. No. 60/302,937, filed Jul. 2, 2001, Ser. No. 60/302,916, filed Jul. 3, 2001, Ser. No. 60/306,202, filed Jul. 18, 2001, Ser. No. 60/307,756, filed Jul. 25, 2001, Ser. No. 60/308,492, filed Jul. 27, 2001, and Ser. No. 60/312,141, filed Aug. 13, 2001;

Ser. No. 12/806,829 is also a continuation of Ser. No. 10/146,527, filed May 15, 2002, which claims the benefit of and priority from U.S. Provisional Patent Application Ser. No. 60/292,100, filed May 17, 2001;

Ser. No. 12/806,829 is also a continuation of Ser. No. 12/586,469, filed Sep. 21, 2009, now abandoned, which is a divisional continuation of Ser. No. 11/702,330, filed Feb. 5, 2007, issuing as U.S. Pat. No. 7,591,210 on Sep. 22, 2009, which is a continuation of Ser. No. 10/189,031, filed Jul. 2, 2002, issuing as U.S. Pat. No. 7,171,879 on Feb. 6, 2007, which claims the benefit of and priority from U.S. Provisional Patent Application Ser. No. 60/302,937, filed Jul. 2, 2001;

Ser. No. 12/806,829 is also a continuation of Ser. No. 11/208,214, filed Aug. 19, 2005, issuing as U.S. Pat. No. 7,784,507 on Aug. 31, 2010, which is a continuation of Ser. No. 10/251,576, filed Sep. 20, 2002, now abandoned, which claims the benefit of and priority to U.S. Provisional Patent Application Ser. No. 60/323,975, filed Sep. 21, 2001, and Ser. No. 10/251,576 is also a continuation-in-part of Ser. No. 10/197,975, filed Jul. 18, 2002, now abandoned, which claims the benefit of and priority to U.S. Provisional Patent Application Ser. No. 60/306,202, filed Jul. 18, 2001, and Ser. No. 11/208,214 is also a continuation-in-part of Ser. No. 09/676,190, filed Sep. 29, 2000, issuing as U.S. Pat. No. 7,055,417 on Jun. 6, 2006, which in turn claims the benefit of and priority from U.S. Provisional Patent Application Ser. No. 60/157,340, filed Oct. 1, 1999 and Ser. No. 60/182,866, filed Feb. 16, 2000;

Ser. No. 12/806,829 is also a continuation of Ser. No. 12/231,080, filed Aug. 29, 2008, issuing as U.S. Pat. No. 7,900,541 on Mar. 8, 2011, which is a continuation of Ser. No. 11/487,717, filed Jul. 17, 2006, issuing as U.S. Pat. No. 7,421,315, on Sep. 2, 2008, which is a continuation of U.S. patent application Ser. No. 10/292,607, filed Nov. 12, 2002, issuing as U.S. Pat. No. 7,077,039 on Jul. 18, 2006, which claims the benefit of and priority from U.S. Provisional Patent Application Ser. No. 60/335,970, filed Nov. 13, 2001;

Ser. No. 12/806,829 is also a continuation of Ser. No. 12/655,962, filed Jan. 11, 2010, now abandoned, which is a continuation of Ser. No. 12/313,277, filed Nov. 17, 2008, issuing as U.S. Pat. No. 7,644,645 on Jan. 12, 2010, which is a continuation of Ser. No. 10/345,630, filed Jan. 15, 2003, now abandoned, which claims the benefit of and priority from U.S. Provisional Patent Application Ser. No. 60/349,989, filed Jan. 16, 2002;

Ser. No. 12/806,829 is also a continuation of Ser. No. 12/658,759, filed Feb. 12, 2010, now abandoned, which is a continuation of Ser. No. 11/787,471, filed Apr. 17, 2007, issuing as U.S. Pat. No. 7,661,343 on Feb. 16, 2010, which is a continuation of Ser. No. 10/341,260, filed Jan. 13, 2003, now abandoned, which claims the benefit of and priority from U.S. Provisional Patent Application Ser. No. 60/351,797, filed Jan. 25, 2002;

Ser. No. 12/806,829 is also a continuation of Ser. No. 11/647,676, filed Dec. 29, 2006, issuing as U.S. Pat. No. 7,836,804 on Nov. 23, 2010, which is a continuation-in-part of Ser. No. 10/923,290, filed Aug. 20, 2004, issuing as U.S. Pat. No. 7,472,634 on Jan. 6, 2009, which claims the benefit of and priority from U.S. Provisional Patent Application Ser. No. 60/496,550, filed Aug. 20, 2003;

Ser. No. 12/806,829 is also a continuation of Ser. No. 12/079,820, filed Mar. 27, 2008, issuing as U.S. Pat. No. 7,845,258 on Dec. 7, 2010, which is a divisional continuation of Ser. No. 10/923,273, filed Aug. 20, 2004, issuing as U.S. Pat. No. 7,350,445 on Apr. 1, 2008, which claims the benefit of and priority from U.S. Provisional Patent Application Ser. No. 60/496,574, filed Aug. 20, 2003;

Ser. No. 12/806,829 is also a continuation of Ser. No. 12/454,569, filed May 18, 2009, issuing as U.S. Pat. No. 7,991,503 on Aug. 2, 2011, which is a continuation of Ser. No. 11/027,600, filed Dec. 31, 2004, issuing as U.S. Pat. No. 7,536,238 on May 19, 2009, which claims the benefit of and priority from U.S. Provisional Patent Application Ser. No. 60/533,791, filed Dec. 31, 2003;

Ser. No. 12/806,829 is also a continuation of Ser. No. 12/799,915, filed May 3, 2010, issuing as U.S. Pat. No. 8,087,438 on Jan. 3, 2012, which is a continuation of Ser. No. 12/322,069, filed Jan. 26, 2009, issuing as U.S. Pat. No. 7,707,918 on May 4, 2010, which is a continuation of U.S. patent application Ser. No. 11/107,499, filed Apr. 15, 2005, issuing as U.S. Pat. No. 7,481,140 on Jan. 27, 2009;

Ser. No. 12/806,829 is also a continuation of Ser. No. 12/077,576, filed Mar. 19, 2008, now abandoned, which is a continuation of Ser. No. 11/027,254, filed Dec. 31, 2004, now abandoned, which claims the benefit of and priority from U.S. Provisional Patent Application Ser. No. 60/533,852, filed Dec. 31, 2003;

Ser. No. 12/806,829 is also a continuation of Ser. No. 12/799,920, filed May 3, 2010, issuing as U.S. Pat. No. 8,122,807 on Feb. 28, 2012, which is a continuation of Ser. No. 11/026,114, filed Dec. 31, 2004, issuing as U.S. Pat. No. 7,707,920 on May 4, 2010, which claims the benefit of and priority from U.S. Provisional Patent Application Ser. No. 60/533,811, filed Dec. 31, 2003;

Ser. No. 12/806,829 is also a continuation of Ser. No. 11/026,006, filed Dec. 31, 2004, issuing as U.S. Pat. No. 8,459,157 on Jun. 11, 2013, which claims the benefit of and priority from U.S. Provisional Patent Application Ser. No. 60/533,575, filed Dec. 31, 2003;

Ser. No. 12/806,829 is also a continuation of Ser. No. 11/045,972, filed Jan. 28, 2005, issuing as U.S. Pat. No. 7,827,890 on Nov. 9, 2010, which claims the benefit of and priority from U.S. Provisional Patent Application Ser. No. 60/540,377, filed Jan. 29, 2004; and Ser. No. 12/806,829 is also a continuation of Ser. No. 12/454,730, filed May 20, 2009, issuing as U.S. Pat. No. 7,997,176 on Aug. 16, 2011, which is a continuation of Ser. No. 11/395,502, filed Mar. 31, 2006, now abandoned, which claims the benefit of and priority from U.S. Provisional Patent Application Ser. No. 60/667,485, filed Mar. 31, 2005.

FIELD

The present disclosure relates to table saws, and more particularly to throat plates for table saws and to table saws adapted for use with the throat plates.

BACKGROUND

A table saw is a power tool that includes a work surface, or table, and a circular blade that extends up through an opening in the table. A person uses a table saw by moving a work piece against and past the spinning blade to cut the work piece. The table opening, or throat, is substantially wider and longer than the blade and provides a portal through which internal components of the table saw, such as the blade-mounting arbor, may be accessed. The table opening is covered during use of the saw by a removable insert, or throat plate, having a slot through which the blade extends. The present document discloses improved throat plates for table saws and table saws adapted for use with the same.

BRIEF DESCRIPTION OF THE DRAWINGS

FIG. 8 is a bottom isometric view of a throat plate according to the present disclosure.

FIG. 9 is a bottom plan view of the throat plate of FIG. 8.

FIG. 10 is a rear elevation view of the throat plate of FIG. 8.

DETAILED DESCRIPTION

Figure 1:
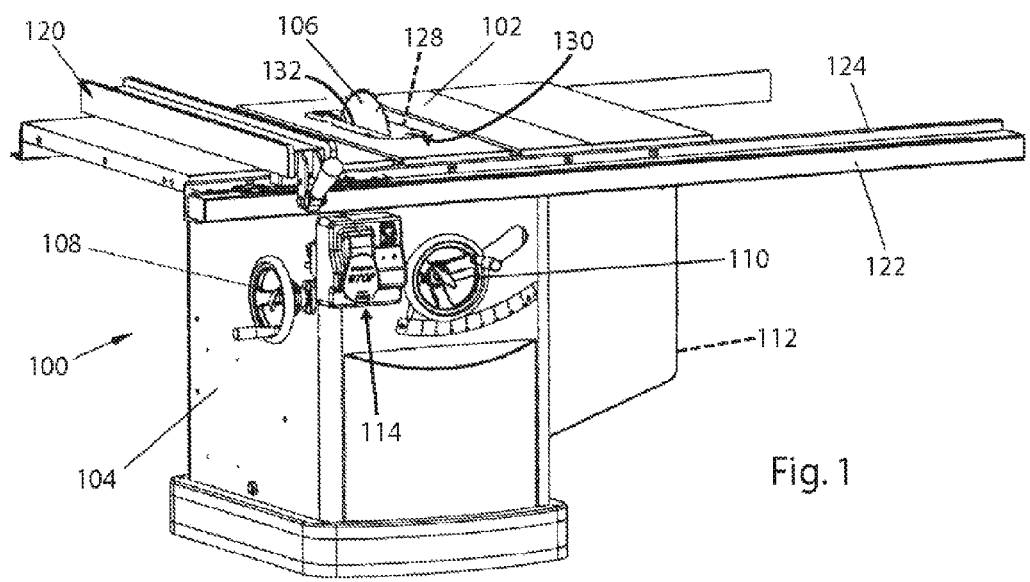
FIG. 1 is an isometric view of an illustrative table saw containing a throat plate according to the present disclosure.

FIG. 1 shows an example of a table saw 100. The illustrative example of a table saw shown in FIG. 1 is often referred to as a cabinet saw or tilting-arbor saw. The saw includes a table, or tabletop, 102 on which a work piece may be cut. The table also may be referred to as being a work surface. The table is mounted on a cabinet or other suitable stand, or platform, 104. In the illustrative example, platform 104 takes the form of an enclosed cabinet, but it is within the scope of the present disclosure that the size and/or construction of the platform may vary, such as to include open frames, housings that are adapted to be supported on other elevated stands, and the like. It is within the scope of the present disclosure that table saw 100 may take a variety of forms, such as larger and/or smaller scale versions of the illustrative saw shown in FIG. 1, as well as a configuration in which at least the table and/or cabinet are differently shaped, sized and/or configured. For example, some table saws that typically are smaller than the illustrated example of saw 100 are referred to as contractor saws, job-site table saws, and/or bench-top table saws. Examples of table saws that typically are larger than the illustrated example of saw 100 include panel saws and sliding table saws.

A blade 106 extends up through a slot in the table to cut a work piece. A motor assembly 112 is adapted to drive the rotation of the blade, typically by driving the rotation of an arbor upon which the blade is mounted. Motor assembly 112 may be supported in any suitable location relative to the blade, such as within or adjacent the cabinet. Saw 100 is shown including hand wheels 108 and 110 that may be turned to adjust the tilt of the blade relative to the tabletop and the elevation of the blade (the height the blade extends above the table). It is within the scope of the present disclosure that table saws that include the disclosed throat plates may include one or both of the illustrated hand wheels or other suitable adjustment mechanisms for adjusting the height and/or tilt of the blade relative to the table. A switch assembly 114 containing at least one switch, such as an on/off switch, provides a user with a mechanism for selectively providing power to the motor and thereby causing the blade to spin responsive to the motor driving the rotation of the arbor assembly upon which the blade is mounted.

Figure 2:
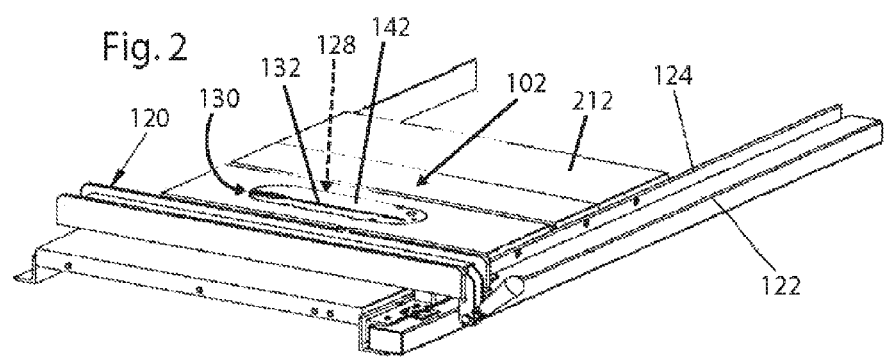
FIG. 2 is an isometric view of the tabletop, fence and rails of the table saw of FIG. 1.

FIGS. 1 and 2 show a fence 120 positioned on table 102. The fence rests on the table and may be slid laterally along the table toward or away from the blade to accommodate work pieces of different sizes. In the illustrated example of a table saw, the fence is adapted to slide upon or otherwise to be positioned upon a rail, or guide, 122. Rail 122 may also be referred to as a guide rail that is adapted to guide the sliding motion of the fence as the subsequently described cross bracket of the fence slides along the rail and is selectively secured in a selected position thereupon by a clamping mechanism. In the illustrated example, rail 122 is mounted on a bracket 124, which is secured to table 102. As mounted on bracket 124 or otherwise coupled to the table, rail 122 is spaced away from the table to define an elongate track, or slide path, that extends along the length of the table between the rail and the table. It is within the scope of the disclosure that the fence may clamp directly to the table or that another suitable guide may be used for the fence. Saw 100 may be used with or without fence 120.

In operation, a user makes a cut by pushing a work piece on the table against and past the spinning blade. In some operations, the work piece is laterally positioned and/or supported by fence 120, with the edge of the work piece abutting against the fence. In other operations, the work piece is slid across the table without contacting the fence, with these operations often utilizing a sled, miter gauge or other positioning device that positions the work piece for sliding in a straight path across the table and into contact with the blade.

As indicated at 128 in FIGS. 1 and 2, the table, or work surface, includes an opening 128 that provides a portal through which internal components of the saw may be accessed. Opening 128 also may be referred to as the throat of the table. For example, blade 106 is mounted on an arbor that may be accessed through the throat, such as to remove and reinstall blade 106 or a different blade upon the arbor. Also shown in FIGS. 1 and 2 is a throat plate 130 that is removably installed in the throat of the work surface. Throat plate 130 also may be referred to as a throat insert or as an insert. In the illustrated examples, throat plate 130 includes an elongate slot 132 through which the blade is selectively extended from beneath the work surface, as shown in FIG. 1. When properly installed, and as perhaps best seen in FIG. 2, the upper surface 142 of the throat plate extends coplanar with the planar upper (or top) surface 212 of the table. Optionally, the front end region of the throat plate may be very slightly recessed beneath the plane of the upper surface of the table.

Slot 132 may be preformed in throat plate 130 or cut into the throat plate prior to installation of the throat plate onto a table saw, such as saw 100. However, in some embodiments it may be desirable for the slot to be cut in the throat plate during the initial use of the throat plate on saw 100. In such an application, the throat plate is formed without slot 132 or with a slot 132 that is thinner and/or shorter than necessary to accommodate a particular blade 106. After installing the throat plate in opening 128, the saw is turned on (i.e., driving rotation of blade 106 by the saw's motor is commenced) with the blade positioned beneath the tabletop and beneath the lower surface of the throat plate. The blade is then raised, typically toward or to its fully elevated position, with the blade cutting slot 132 in the throat plate as it is raised. Such an insert may be referred to as a "zero clearance" insert, or a "zero clearance" throat plate, because the throat plate extends very close to each side of the blade, with minimal clearance on each side. A benefit of a zero clearance throat plate is that a work piece to be cut is supported by the throat plate even in positions that extend very close to the blade. This support of the work piece proximate the blade tends to reduce chipping of the work piece that might otherwise occur during cutting of the work piece with a throat plate having a wider slot.

It is within the scope of the present disclosure that throat plates 130 may be formed with or without a slot 132. For example, in FIG. 3, the throat plate is shown without a slot formed or cut therein (thereby indicating that the slot needs to be cut or otherwise formed in the throat plate prior to use of the throat plate when cutting work pieces with a table saw. In FIG. 4, the throat plate is shown with a slot, such as may be preformed in the throat plate or cut into the throat plate after production of the throat plate. The slot shown in FIG. 4 is intended to provide a graphical example of a slot 132 that may be formed in throat plate 130, and it is within the scope of the present disclosure that other slots 132 may have different dimensions, such as being longer or shorter and/or narrower or wider than the example of a slot shown in FIG. 4. When throat plate 130 is formed with a slot 132, the slot may be sized to accommodate selected dimensions of blades without further removal of material from the throat plate. It is also within the scope of the disclosure that a preformed slot may be undersized and therefore require additional removal of material from the throat plate to lengthen and/or widen the slot prior to use of the throat plate with a particular blade to cut work surfaces on a table saw.

Figure 3:
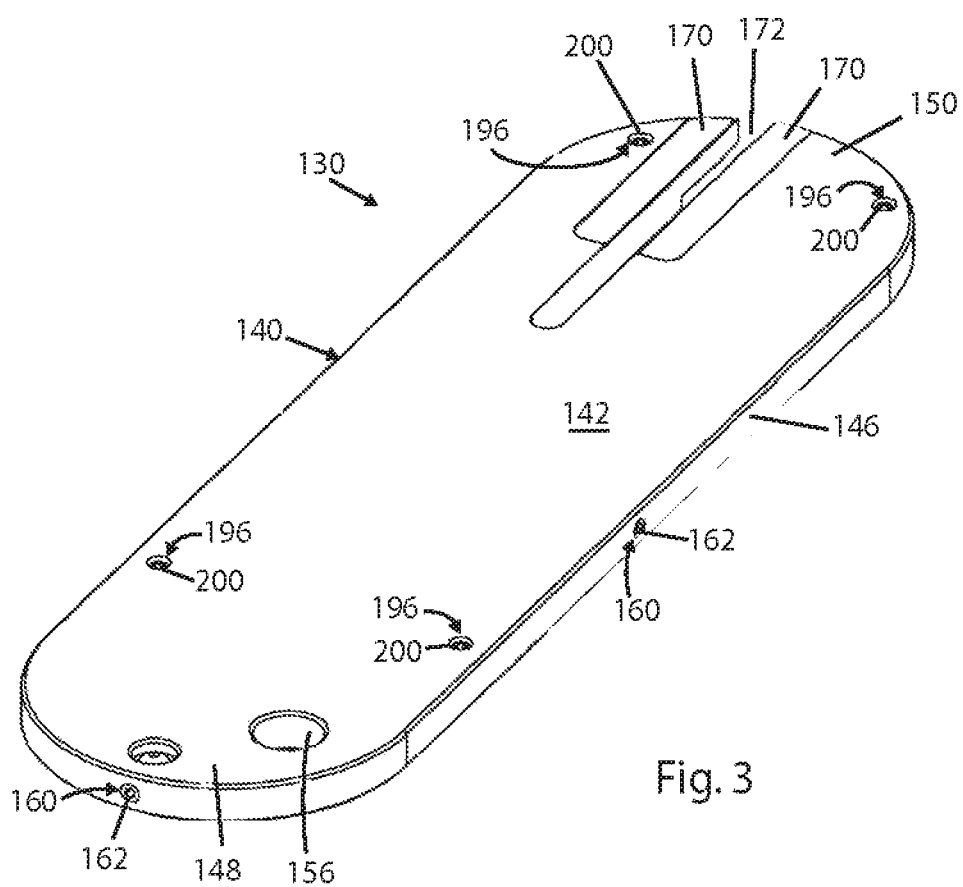
FIG. 3 is a front isometric view of a throat plate according to the present disclosure.
Figure 4:
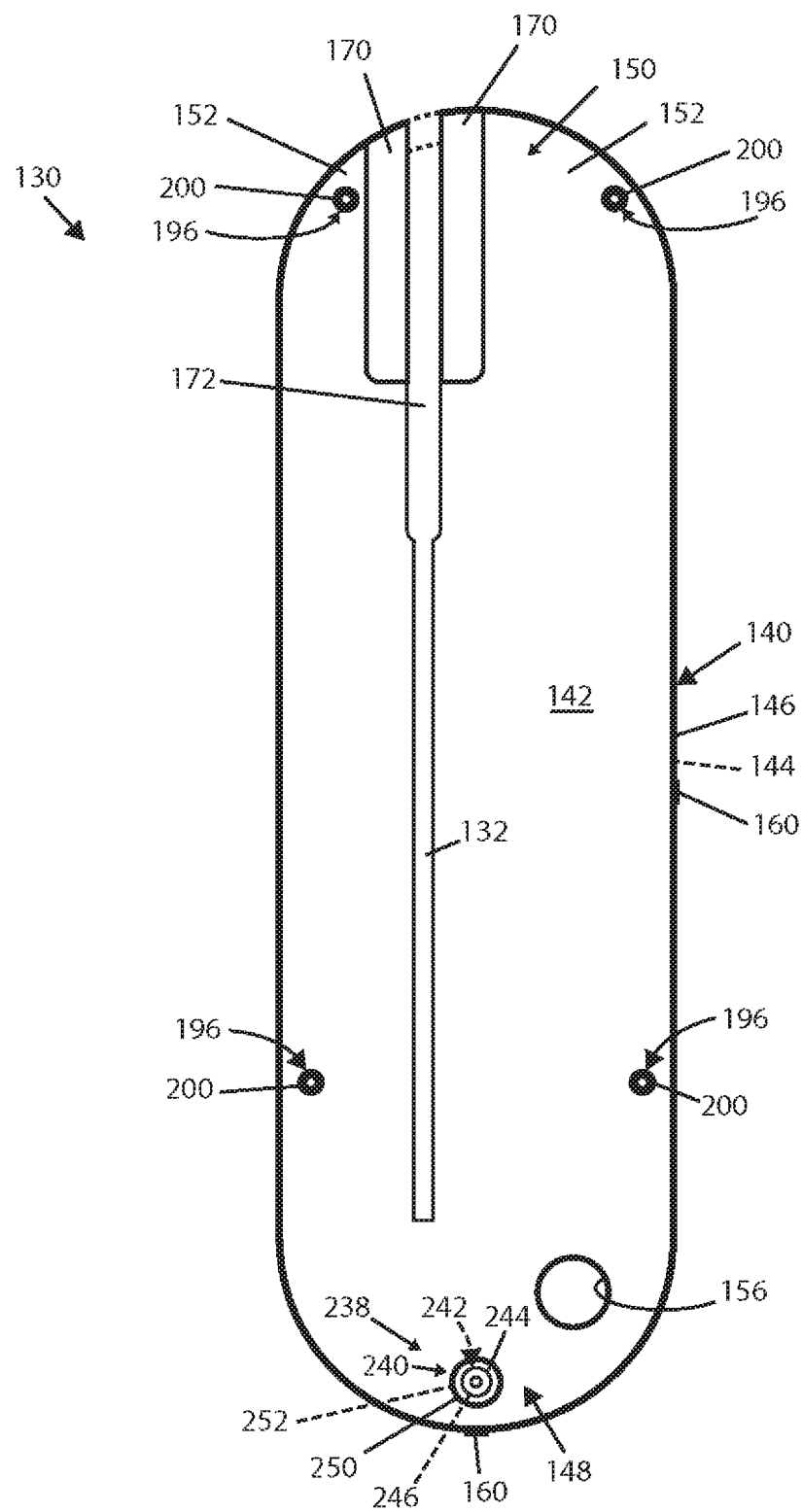
FIG. 4 is a top plan view of the throat plate of FIG. 3 including a slot.

As indicated in FIGS. 3 and 4, throat plate 130 includes a body 140 having an upper surface 142, a lower surface 144 and a perimeter edge 146. The plate has a front end region 148, which during use of the throat plate extends forward of the blade and toward a work piece to be cut with the table saw, and a rear end region 150, which during use of the throat plate extends rearward of the blade and thereby is sequentially contacted by a work piece being cut after the front end region and then after the blade. Also shown in FIGS. 3 and 4 is an optional finger hole 156, which extends through the body of the throat plate and is sized so that a user may insert one of the user's fingers through the hole to grasp the throat plate and remove the throat plate from opening 128. As discussed in more detail herein, throat plates 130 according to the present disclosure may require release of one or more securement mechanisms prior to a user being able to remove the throat plate from the opening of the table.

In the illustrative example of a throat plate 130 according to the present disclosure that is shown in FIGS. 3 and 4, the throat plate includes a pair of translational adjustment mechanisms, or translational adjustment mechanisms, 160 that are adapted to adjust the position of the throat plate within the throat, or opening, of the table saw within a plane that extends parallel to the plane of the table's upper surface. In other words, mechanisms 160 are adapted to adjust the lateral and/or forward/rearward position of the throat plate within the throat of the table saw. It is within the scope of the present disclosure that throat plate 130 may be formed without mechanisms 160, in which case the throat plate is preferably sized to precisely fit within the throat of the table. It is also within the scope of the present disclosure that throat plate 130 may include only a single mechanism 160, or more than two mechanisms, such as three, four, or more mechanisms spaced apart around perimeter edge 146 of the throat plate. Mechanisms 160 preferably are adapted to project an adjustable distance away from the perimeter edge of the throat plate and to thereby engage the internal perimeter of the throat, or opening, in the table. Translational adjustment mechanisms 160 may take any suitable form. In the illustrated example, and as indicated in FIG. 3, mechanisms take the form of set screws 162 that may be extended from or retracted toward the perimeter edge of the throat plate by rotating the screws relative to the throat plate. Additional illustrative examples of suitable mechanisms 160 include one or more spring-biased members that are slidably adjustable along a plane extending parallel to the plane of the table's upper surface, and which are biased by a spring, elastomer or other biasing mechanism to extend away from the throat plate and into contact with the internal perimeter of the throat to support the throat plate in a stable position within the throat. Additional illustrative examples are disclosed in one or more of the disclosures that are incorporated by reference herein.

It is within the scope of the present disclosure that table 102 may additionally or alternatively include one or more translational adjustment mechanisms 160, such as any of those discussed or incorporated herein. In such an embodiment, the adjustment mechanisms, which may be referred to as table-extending adjustment mechanisms are adapted to extend, and preferably adjustably extend, from the internal perimeter of the throat to engage the perimeter edge of the throat plate to position the throat plate laterally and/or in forward/rearward directions relative to the throat.

In the illustrative example shown in FIGS. 3 and 4, throat plate 130 includes a pair of optional metal surfaces, or pads, 170 that form a portion of the upper surface of the throat plate at the rear end region of the plate, with one pad on each side of slot 132. Pads 170 may be attached to the throat plate by any suitable mechanism, illustrative and non-exclusive examples of which include molding the throat plate to or around the pads and adhesively bonding the pads to the throat plate. The metal pads provide durable surfaces upon which anti-kickback pawls of a blade guard may slide. The pads may extend through the body of the throat plate, or may extend from the upper surface of the throat plate and only partially through the body of the throat plate. The pads are configured to prevent the anti-kickback pawls from catching on or scratching the throat plate and/or the table of the saw. It is within the scope of the present disclosure that throat plate 130 may be formed without pads 170. For example, in some embodiments, the throat plate may be constructed from metal or another suitable material(s) that is resistant to being scratched or snagged by the anti-kickback pawls of the blade guard. In some embodiments, the saw may not be used with a blade guard or may be used with a blade guard that either does not include anti-kickback pawls or which includes anti-kickback pawls which themselves are adapted to not scratch or catch upon the throat plate or adjacent region of the table.

In the illustrative example of a throat plate 130 according to the present disclosure shown in FIGS. 3 and 4, the throat plate includes an optional accessory mounting port 172 that extends through the body of throat plate 130 and provides a passage through which an accessory, such as a safety device, may extend from beneath the table of the table saw. In the illustrated example, port 172 extends from perimeter edge 146 at the rear end region 150 of the throat plate generally parallel and coextensive with the long axis of slot 132 (such as perhaps best seen in FIG. 4). In such a configuration, the port may be described as partitioning the rear end region of the throat plate into a pair of spaced-apart members 152, with the port interrupting what otherwise would be a closed perimeter edge of the throat plate. As shown, port 172 is wider than the slot and is bounded by pads 170. It is within the scope of the present disclosure that the port may be defined entirely within the perimeter of the throat plate (i.e., not intersecting with the perimeter edge of the throat plate). A graphical example of this variation is indicated in dashed lines in FIG. 4. It is also within the scope of the present disclosure that the slot is at least as wide as the port, and that the throat plate may be formed without port 172.

Illustrative examples of accessories that may be permanently or removably mounted beneath the table of the saw and adapted to extend through port 172 include one or more of a blade guard, a splitter and a riving knife. These illustrative examples preferably extend through port 172 and are positioned to extend generally parallel to the blade (at least within a range of heights that are coextensive with the blade) so as not to obstruct passage of a work piece being cut as it is pushed into contact with and beyond the blade. The attachments, when present, may be coupled beneath the table by any suitable permanent or releasable mounting system. Illustrative and non-exclusive examples of suitable mounting systems and attachments are disclosed in U.S. patent application Ser. No. 11/045,972, which was filed on Dec. 31, 2004, is entitled "System to Mount and Index Table Saw Attachments," and the complete disclosure of which is hereby incorporated by reference for all purposes.

Figure 5:
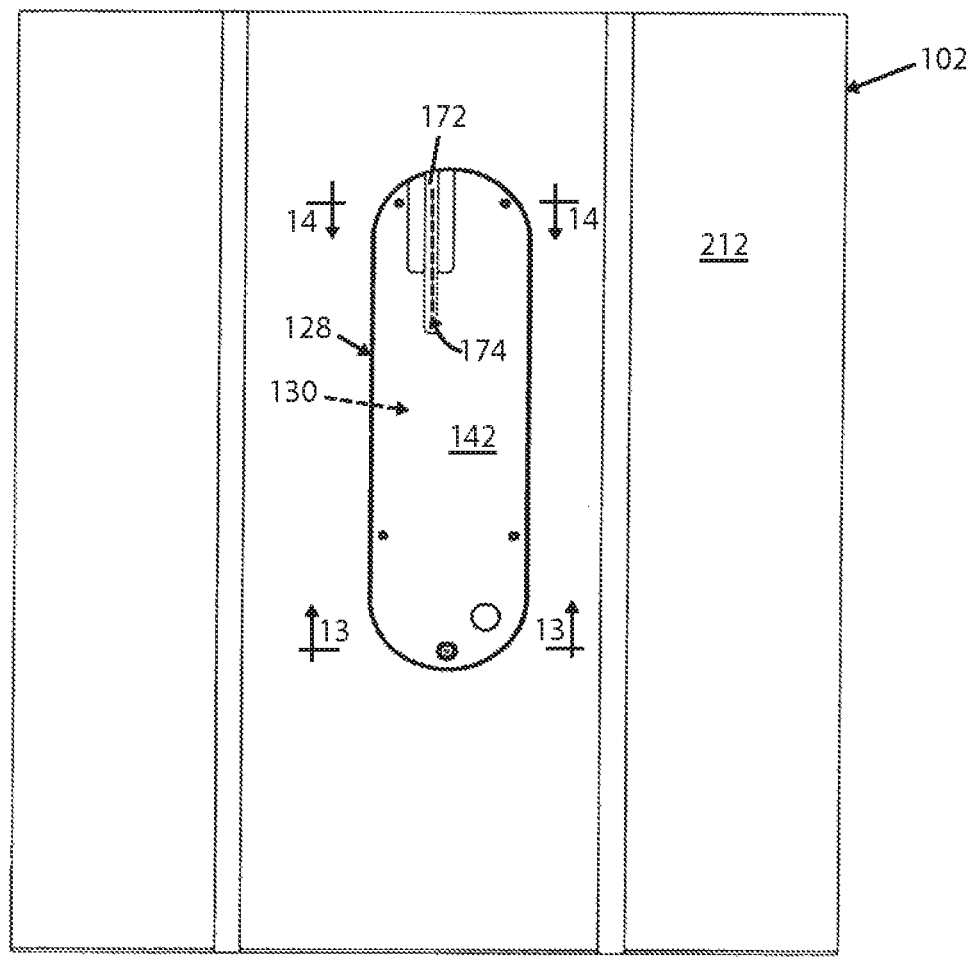
FIG. 5 is a top plan view of a table of a table saw containing a throat plate according to the present disclosure.
Figure 6:
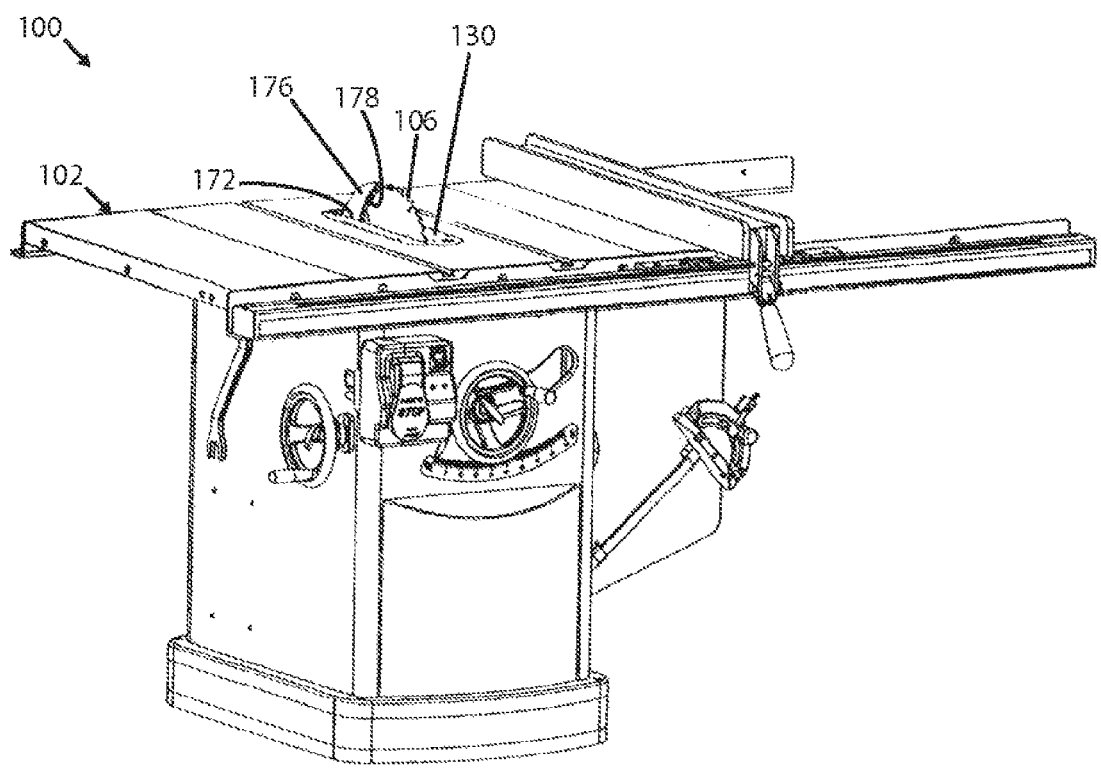
FIG. 6 is a front isometric view of a table saw containing a throat plate according to the present disclosure and including an accessory in the form of a riving knife.

FIG. 5 shows an illustrative throat plate 130 installed on a table 102, with a portion of an accessory mounting system being visible through port 172 and indicated generally at 174. FIG. 6 shows an example of a table saw with an accessory in the form of a riving knife 176 extending through port 172. A riving knife is a fin-like plate positioned adjacent the rear edge of saw blade 106 and within the projected kerf and top-to-bottom cutting capacity of the blade. A riving knife functions to keep a work piece from shifting sideways and catching on the rear edge of the blade and being kicked back at the user by the blade. The riving knife is preferably mounted in a table saw so that it remains in a fixed position relative to the blade as the blade tilts and changes elevation. Thus, as a work piece is cut by the blade, the riving knife will fit into the newly cut slot in the work piece so that it does not block or impede the movement of the work piece past the blade and so that it restricts portions of the work piece being cut from engaging the teeth at the back of the blade. In the illustrative example, riving knife 176 has a leading edge 178 that is curved to follow the edge of whatever blade or blades are intended to be used with the riving knife.

Figure 7:
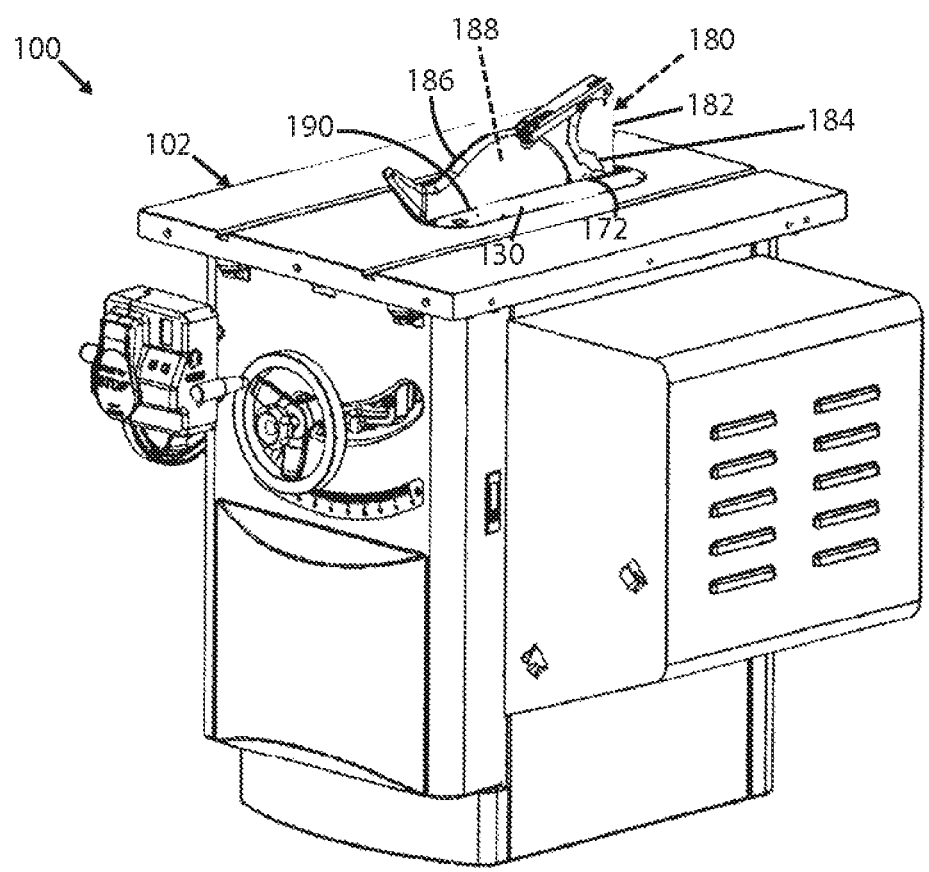
FIG. 7 is a front isometric view of a table saw containing a throat plate according to the present disclosure and including an accessory in the form of a blade guard.

FIG. 7 shows an example of a table saw with an accessory in the form of a blade guard 180 that also includes a splitter 182 extending through port 172. A splitter is a flat plate, similar to a riving knife, but typically extending above the top-to-bottom cutting capacity of the blade so that a blade guard can be mounted thereto. An anti-kickback device such as anti-kickback pawls, illustrative examples of which are indicated at 184 and which are toothed pawls positioned to oppose a work piece being thrown back toward a user, are often mounted on the splitter. Splitters typically tilt with the blade, but do not move up and down with the blade. Blade guard 180 includes a blade shroud 186 shaped to fit over the blade and shield a person from accidentally contacting the blade. The shroud forms a cavity 188 within which the blade may spin. Blade guard 180 is adjustably positioned relative to the upper surface of the table so that it may be adjusted to accommodate work pieces of different thicknesses under the lower edge 190 of the blade shroud. Splitter 182 (with or without pawls 184) optionally may be utilized as an accessory independent of the blade guard.

In FIGS. 8 and 9, an illustrative example of a suitable lower surface 144 of a throat plate 130 according to the present disclosure is shown. In the illustrative example, plate 130 includes the previously discussed (and optional) accessory mounting port 172. In the illustrative example shown in FIGS. 8 and 9, the lower surface of the table saw includes a central recess 198 that extends into the body of the throat plate proximate the location of slot 132 (which is shown in FIG. 9). In some embodiments, it may be desirable to preform recess 198 in "zero clearance" throat plates to reduce the amount of material that needs to be removed from the body of the throat plate by the table saw's blade to form slot 132. In the illustrative example, the recess includes a chamfered side wall 192. Side wall 192 similarly reduces the amount of the body of the throat plate that needs to be cut by the table saw's blade when configuring the throat plate to receive the blade when the blade is angled relative to the plane of the table saw's table.

It is within the scope of the present disclosure that either, both, or none of the side walls of the recess may be chamfered or otherwise extend at an angle relative to the lower surface of the throat plate. For example, some table saws are adapted to selectively tilt the blade to the right relative to the plane of the table saw's table (from the perspective of a user standing in front of the saw), while others are adapted to selectively tilt the blade to the left. Having both sidewalls of the recess chamfered adapts the throat plate for use with both right- and left-tilt table saws. As discussed, however, recess 198 is not required to be preformed into the throat plate, as a user may remove any necessary portion of the throat plate's body 140, such as depending upon the user's preferences, the configuration of the table saw with which the throat plate will be used, the type and size of the blade(s) being used, etc.

Also shown in FIGS. 8 and 9 are optional removed regions 194 that provide graphical representations that the lower surface of the throat plate is not required to be planar and that it may, for example, be shaped to provide clearance for portions of the table saw's internal components, such as the arbor, blade-mounting washer and/or nut, etc., that otherwise might engage the lower surface of the throat plate in some applications.

As discussed previously, throat plates 130 and/or table saws 100 according to the present disclosure may include one or more translational adjustment mechanisms 160 that are adapted to stabilize and/or position the side-to-side and/or forward-rearward position of the throat plate within the throat relative to a plane extending parallel to the upper surface of the table. It is also within the scope of the present disclosure that throat plates 130 and/or table saws 100 according to the present disclosure include one or more height adjustment mechanisms that are adapted to define the vertical position of the throat plate within the throat of the table relative to the plane of the table's upper surface. Similar to the above-discussed translational adjustment mechanisms, the height adjustment mechanisms may extend from the lower surface of the throat plate to engage a platform or support upon which the throat plate is supported and/or may extend from such a platform or support to engage the lower surface of the throat plate. It is also within the scope of the present disclosure that the throat plate and/or corresponding table saw may be formed without any height adjustment mechanisms.

In FIGS. 8-10, throat plate 130 is shown including a plurality of height adjustment mechanisms that are spaced apart around the lower surface 144 of the throat plate and adapted to extend an adjustable distance away from the lower surface of the throat plate to engage a platform or support upon which the throat plate is supported within the throat of the table saw. A benefit of having a plurality of spaced-apart height adjustment mechanisms is that selective adjustment of the mechanisms permits the left-to-right and front-to-back orientation of the throat plate to be adjusted relative to the plane of the upper surface of the table saw's table. Illustrative, non-exclusive examples of suitable height adjustment mechanisms are generally indicated at 196 in FIGS. 9 and 10. As indicated in FIG. 10, each mechanism includes a contact surface 197 that is adapted to engage a corresponding support or surface against which the throat plate is supported within the throat of the table saw. In the illustrated examples, the mechanisms are threaded and therefore adapted to be extended away from or retracted toward (and/or into) the throat plate by rotation of the mechanism relative to the throat plate. The number, position, and configuration of mechanisms 196 that are utilized with a particular throat plate 130 may vary without departing from the scope of the present disclosure.

By referring back to FIG. 4, it can be seen that the illustrative examples of mechanisms 196 include tool-receiving sockets 200 that are adapted to be accessed from the upper surface 142 of the throat plate. The illustrated sockets are adapted to receive a hex wrench, but it is within the scope of the present disclosure that the configuration of the sockets may vary to accommodate different shapes and/or types of tools. It is also within the scope of the present disclosure that any suitable structure may be used for adjusting the degree to which mechanisms 196 extend from the throat plate, including mechanisms that are accessed from the lower surface of the throat plate and mechanisms that are adjusted by manipulating the portion of the mechanism that projects away from the lower surface of the throat plate.

Figure 11:
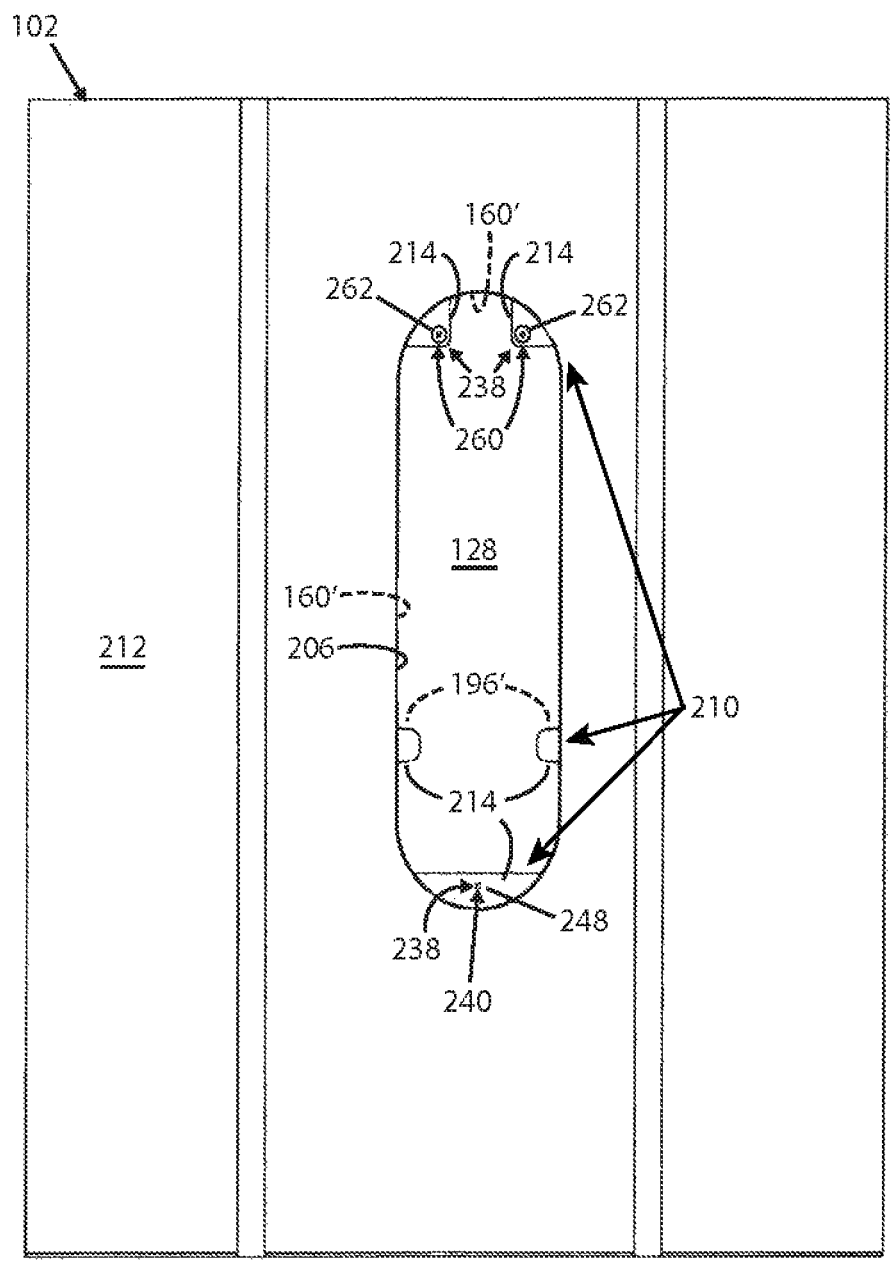
FIG. 11 is a top plan view of a table adapted for use with the throat plate of FIG. 8.

FIG. 11 shows the table 102 of a table saw 100 that is adapted for use with a throat plate according to the present disclosure, with FIG. 11 showing the throat 128 of the table with the throat plate removed. As shown, the table saw includes a support structure 210 that is adapted to support the throat plate within throat 128. Support structure 210, or portions thereof, may be formed as a portion of the table and/or may be attached to the table, such as to the lower surface of the table. Support structure 210 is adapted to prevent the throat plate from falling through the throat of the table and to at least partially define the horizontal position of the throat plate relative to the upper surface 212 of the table.

When installed, throat plate 130 (and/or any height adjustment mechanisms or other extensions of the throat plate) engages, or rests upon, support structure 210. In the illustrated example, structure 210 takes the form of a plurality of spaced-apart projections, or supports, 214 that extend inward of the internal perimeter 206 of the throat. It is within the scope of the present disclosure that the size, configuration, and/or number of projections 214 may vary, including a single projection that extends around the entire, or substantially the entire, internal perimeter of the throat.

As discussed, it is within the scope of the present disclosure that the table may include one or more translational and/or height adjustment mechanisms that adjustably extend into the throat from the internal perimeter 206 of the throat or the support structure upon which the throat plate is supported. Schematic graphical representations of this optional construction are provided in FIG. 11 in dashed lines at 160' and 196', with it being within the scope of the present disclosure that the number, if any, of these table-extending adjustment mechanisms may vary.

Throat plates 130 according to the present disclosure also include at least one securement mechanism 238 that is adapted to couple the throat plate to the table saw and to prevent inadvertent raising of the throat plate, or portions thereof, above the surface of the table saw during use of the saw. As such, the securement mechanisms may be described as being adapted to secure the throat plate to the table saw, such as to support structure 210. The securement mechanisms may be entirely integrated into the table or other portion of the saw other than the throat plate, entirely integrated into the throat plate, or may include interengageable elements that are respectively associated with, or otherwise form a portion of, both the throat plate and the table or other portion of the table saw other than the throat plate. By "interengageable," it is meant that the elements are adapted to be selectively interconnected together to restrict inadvertent removal of the throat plate from the throat of the table saw, but that the elements may also be selectively (i.e., intentionally) disconnected to permit removal of the throat plate, when desired. In the subsequently discussed examples, illustrative examples of securement mechanisms are shown that provide threaded interconnections between the throat plate and the support structure and that provide structural detents, or anchors, that prevent at least a portion of the throat plate from being raised vertically out of the throat.

In FIGS. 4 and 11, an example of a securement mechanism 238 is shown and generally indicated at 240. As shown in FIG. 4, mechanism 240 includes a fastener 242 in the form of a threaded screw or bolt 244 that extends through a bore 246 in the front end region 148 of the throat plate and is threadingly received into a complimentarily threaded receiver, or bore, 248 in a support structure 210, as shown in FIG. 11. By threading the fastener into the socket, the front end region of the throat plate is secured to support structure 210 and thereby restricted from being removed upwardly and out of the throat. While bolt 244 and receiver 248 are illustrated as being complimentarily threaded, it is within the scope of the present disclosure that other suitable releasable fastening mechanisms, such as mechanisms that mechanically interlock the corresponding elements, may be used. In some embodiments, a threaded interconnection may be desired because the degree to which the corresponding portion of the throat plate is urged toward and/or against the support structure may be adjusted by the user by the degree to which the fastener is threaded into the receiver.

Figure 12:
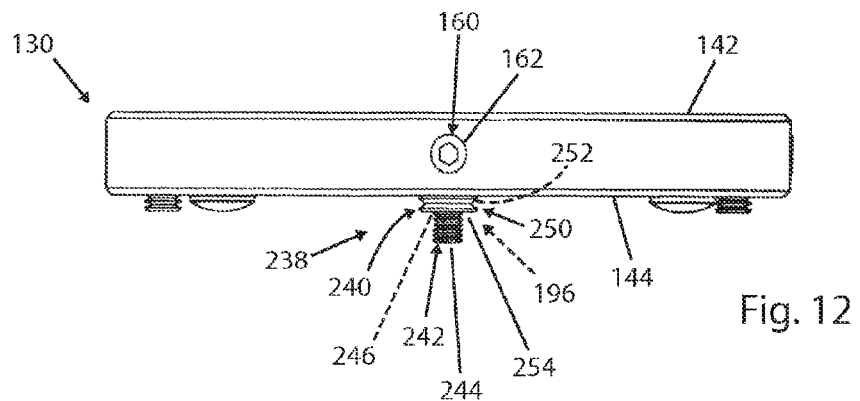
FIG. 12 is a front elevation view of a throat plate constructed according to the present disclosure.

In the illustrated example of a securement mechanism 240, the mechanism further includes a socket, or bushing, 250 through which fastener 242 extends as it, in turn, extends through the throat plate and into receiver 248. As perhaps best seen in FIG. 13, socket 250 is adjustably positioned relative to the throat plate, such as with the socket being threadingly engaged with a threaded aperture 252 in the throat plate, and with bore 246 extending through the socket. Bore 246 may be shaped to receive a hex-driver, allen wrench, or some other driver so that the position of socket 250 relative to the throat plate may be adjusted by screwing the socket in or out of threaded aperture 252. In the illustrated example, the socket includes a terminal portion 254 that extends beneath the lower surface 144 of the throat plate. In such an embodiment, the socket provides an additional example of a height adjustment mechanism 196, as indicated in dashed lines in FIG. 12 in that the degree to which terminal portion 254 extends beneath the lower surface of the throat plate affects the height of the front end region of the throat plate relative to the upper surface 212 of the table. In such an embodiment, socket 250 may also be described as providing a stop or limit to the degree to which the front end region of the throat plate may be drawn toward the support structure, and/or beneath the upper surface of the table. For example, in some embodiments, it may be desirable to utilize mechanism 240 to provide a slight bend or curvature to the throat plate, with the rear end region of the throat plate being retained in a planar (or other selected) relationship to the upper surface of the table and the front end region drawn slightly beneath the plane of the upper surface of the table.

Figure 13:
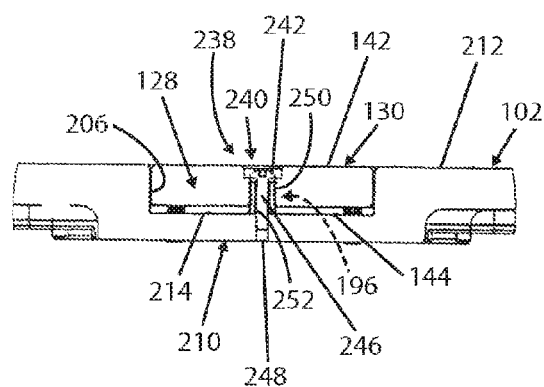
FIG. 13 is a fragmentary partial cross-sectional detail taken along the line 13-13 in FIG. 5.

In FIG. 13, the front end region of throat plate 130 is shown supported on projection 214 of support structure 210. As shown, securement mechanism 238 defines the height of the throat plate relative to the upper surface 212 of table 102 while also securing the front end region of the throat plate to the support structure to prevent removal of the throat plate from throat 128 until the corresponding elements of mechanism 238 are disengaged from each other. In variations of this construction, securement mechanism 240 may be formed without socket 250, in which case bore 246 may be formed in the front end region of the throat plate. Other variations include socket 250 being secured in a fixed position relative to the throat plate and/or socket 250 being formed without a projecting terminal portion 254 that extends beneath the throat plate. Although illustrated and described in the context of securing the front end region of the throat plate to support structure 210, it is within the scope of the present disclosure that mechanism 240 may be used to secure other regions of the throat plate to the support structure and/or that more than one such mechanism 240 is used.

Another example of a suitable securement mechanism 238 is shown in FIGS. 10 and 11 and generally indicated at 260. In the illustrated example, a pair of mechanisms 260 are shown and are adapted to secure the rear end region of the throat plate to the support structure and to prevent the rear end portion from being raised upwardly out of the throat. Similar to the previously discussed examples of securement mechanisms 238 and/or positioning mechanisms 160 and/or 196, it is within the scope of the present disclosure that the number, positioning and/or construction of securement mechanisms 260 that are implemented with a particular throat plate and/or saw may vary without departing from the scope of the present disclosure.

Figure 14:
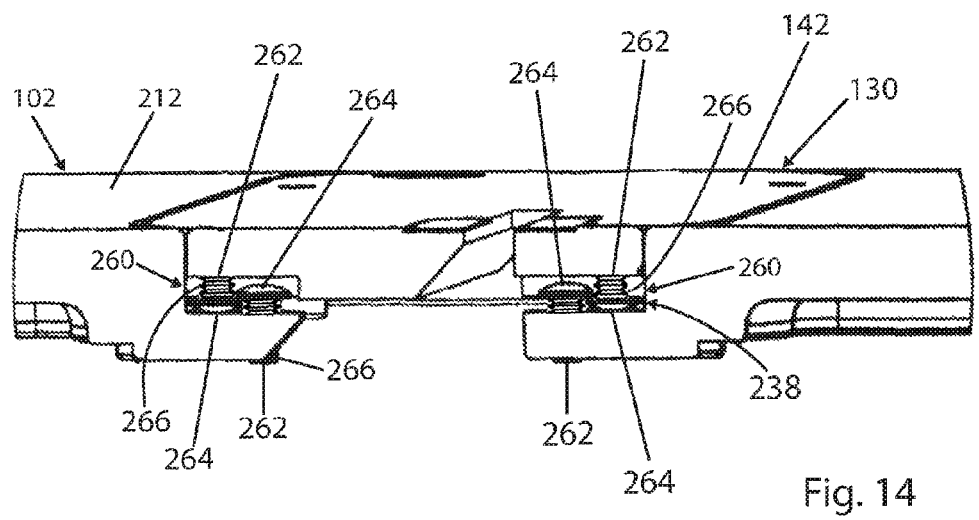
FIG. 14 is a fragmentary partial cross-sectional detail taken along the line 14-14 in FIG. 5.

In the illustrated example, which is perhaps best seen in FIG. 14, the throat plate and support structure both include retainers 262 with heads 264 having laterally projecting contact surfaces that are adapted to respectively engage each other when the throat plate is installed into the throat of the table saw, with the engagement of the respective contact surfaces preventing the throat plate from being withdrawn vertically from the throat plate. In other words, contact surfaces of the retainers extending from the support structure (or other suitable portion of the table saw other than the throat plate) interengage or overlap with the contact surfaces of the retainers extending from the throat plate to prevent vertical removal of the rear end region from the throat by providing a stop or barrier through which the contact surfaces of the retainers from the throat plate cannot pass in a vertical direction. Instead, the throat plate must be slid generally laterally (and/or laterally at an incline) until the respective contact surfaces are disengaged from each other (i.e., no longer contact or overlap each other). Thereafter, the throat plate may be vertically or otherwise removed from the throat. In the illustrated embodiment, heads 264 are examples of first and second contact surfaces, and the laterally projecting contact surfaces on heads 264 are examples of first and second contact ledges.

In the illustrated example, the retainers include shafts 266 that extend from the corresponding lower surface 144 of the throat plate and upper surface of the support structure to position the heads, with the shafts being sized to provide clearance for the heads to be positioned in the overlapping relationship described above. The examples of retainers 262 shown in FIG. 14 also may be seen in FIGS. 10 and 11. As illustrated, the shafts are threaded shafts that are adjustably received into correspondingly threaded bores in the throat plate and support structure to enable the distance between the head 264 and the corresponding structure from which the retainer extends to be selectively adjusted. It is within the scope of the present disclosure that other suitable adjustment mechanisms may be used. It is also within the scope of the present disclosure that only some, or none, of the retainers are adjustable. For example, the retainers that extend from the throat plate may be adjustable, with the retainers that extend from the support structure extending in a fixed position relative to the support structure (or vice versa). It is within the scope of the present disclosure that the retainers that extend from the throat plate may have a different configuration from the retainers that extend from the support structure or other portion of the table or table saw other than the throat plate. In other words, having similarly shaped or identical constructions of the retainers is not required. Instead, the retainers that extend from the throat plate and the table (or support structure, etc.) should simply be configured to have respective contact ledges that selectively interengage or overlap with each other to secure and restrict vertical removal of at least the corresponding portion of the throat plate from the throat of the table. The retainers that extend from the throat plate may include sockets or holes 200 (shown in FIG. 4) in the threaded ends of shafts 266, opposite heads 264, so that the position of the retainers can be adjusted by a user without having to remove the throat plate from the table opening. With this configuration, a user may insert a hex wrench or other driver into the socket in the threaded ends of the retainers extending from the throat plate and then screw the retainers in or out to properly position them relative to the throat plate and relative to the retainers that extend up from the table. The retainers that extend up from the table, in contrast, may include standard sockets in heads 264 so that they may be screwed in or out relative to the table. Alternatively, the retainers may include sockets in both the threaded ends and heads 264 so the retainers can be used in either the throat plate or the table.

Referring back to FIG. 14, the shafts 266 of the illustrated retainers define long, or longitudinal, axes that extend perpendicular to the surface from which the retainers extend, with the axes of the retainers extending generally parallel to each other in an offset, or spaced-apart relationship. While this construction is not required and/or illustrated positioning is not required, as shown, the retainers that extend from the support structure extend closer to the slot and/or the accessory mounting port than the corresponding retainers that extend from the throat plate.

Described in other terms, the retainers that extend from the support structure are adapted to separately retain and maintain a determined amount of separation between the retainers that extend from the throat plate when the throat plate is installed in the throat of the table. As such, the spaced-apart members of the rear end portion of the illustrative example of a throat plate are separately secured and positioned relative to each other and the table. In other words, heads 264 of the retainers that extend down from the throat insert may be sized and/or positioned so that they contact and interfere slightly with the shafts 266 of the retainers that extend upward from the table. In this manner, shafts 266 of the retainers that extend upward from the table maintain and/or bias the retainers that extend downward from the throat insert apart and prevent port 172 from closing.

Figure 15:
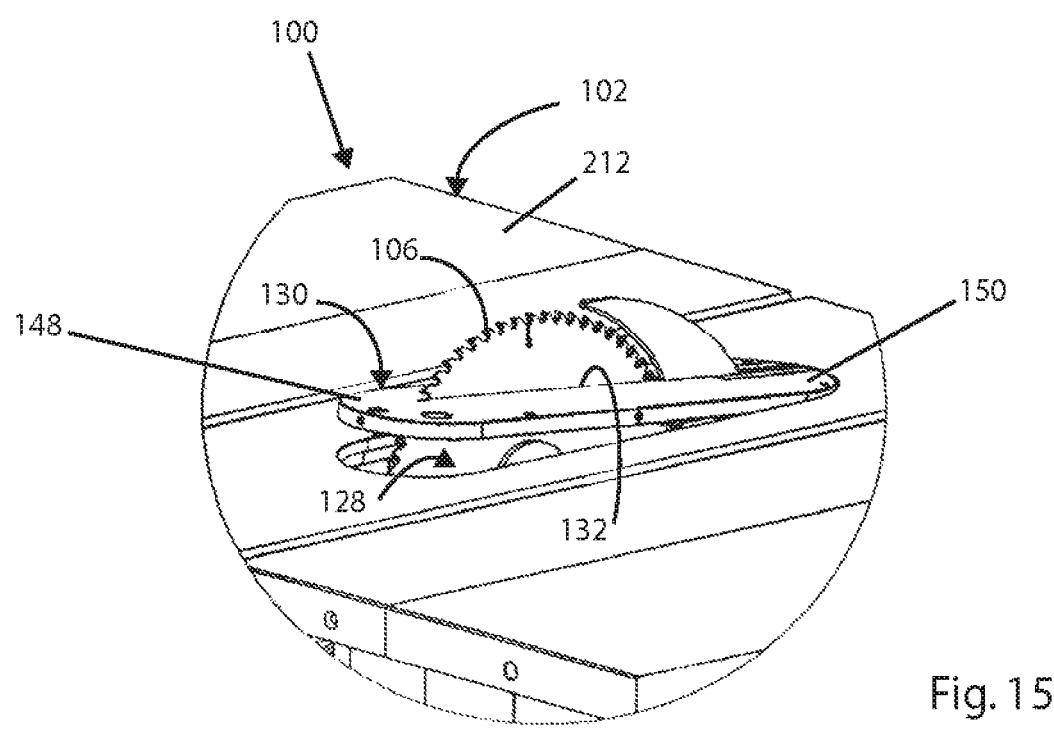
FIG. 15 is a fragmentary isometric view illustrating the throat plate of FIG. 8 being installed into the throat of the table of FIG. 11.

As discussed, securement mechanisms 260 are adapted to prevent vertical removal of the installed throat plate 130 from the throat of table 102. In at least the depicted example, the throat plate should therefore be inserted into the throat at an angle by sliding the contact surfaces of the retainers that extend from the throat plate under the contact surfaces that extend from the support structure to interengage the contact surfaces. An example of this installation step is shown in FIG. 15. Thereafter, the front end region may be lowered into the throat, with securement mechanism 240 then used to secure the front end region relative to the throat. To remove the throat plate, this process is reversed.

Throat plate 130 may be constructed from any suitable material or combination of materials. For many table saws, these materials may include one or more of wood, metal, plastics and/or other composite or polymeric materials. Suitable metals include steel and aluminum, although others may be used. Throat plate 130 may also be formed from a softer material, such as nylon, that is molded or otherwise formed around or upon a frame that is formed from metal or another suitably stiff material that provides rigidity to the throat plate. In some applications, it may be desirable to form the throat plate, or at least the outer surfaces thereof, from a non-conductive material, such as wood or a non-polymeric material such as a phenolic resin. For example, when throat plate 130 is used on a saw that is equipped with a contact detection system that relies upon electrical isolation of the blade from the table of the saw, the throat plate should be constructed so that it does not establish an electrical contact path between the blade and/or arbor and the table. Illustrative examples of contact detection systems are disclosed in U.S. Published Patent Application Nos. 2002-0017176-A1 and 2002-0069734-A1, and U.S. patent application Ser. No. 11/027,600, the complete disclosures of which are hereby incorporated by reference for all purposes. In other applications, such as when the throat plate is used with a table saw that does not include a contact detection in which the blade is not electrically isolated from the table, forming the throat plate from a non-conductive material is optional.

In the illustrative example, the throat plate is substantially formed from a non-conductive phenolic resin to which a non-conductive upper surface layer of melamine is attached. The melamine provides a hard and smooth surface on which work pieces may slide. This construction is not required, but has proven to be effective.

The throat plate may alternatively not include an accessory mounting port 172, as explained previously. Such a throat plate is particularly applicable for use with dado stacks, which are stacks of blades used to make slots or other non-through cuts in a work piece. Accessories such as riving knives and splitters often cannot be used with dados because the dado does not cut through the work piece, and therefore, there is no need to have an insert with an accessory mounting port.

INDUSTRIAL APPLICABILITY

The throat plates disclosed herein are applicable to table saws and other power equipment having removable inserts through which a blade or cutting tool extends during use of the tool.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and subcombinations of features, functions, elements and/or properties that may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. An insert for use with a table saw, the insert comprising:
   a main body having a rear portion, an underside, a perimeter, and a first threaded bore in the underside of the rear portion; and
   a first retainer, where the first retainer has a threaded shaft with two ends, where one of the two ends is threaded into the first threaded bore, where the other of the two ends has a first head, where the first head has a laterally projecting first contact surface, where the first contact surface is positioned to extend under and thereby overlap at least a part of the table saw under the rear portion of the insert when the insert is installed in the table saw, where the first contact surface extends under the table saw without the first retainer having to be rotated when the insert is installed in the table saw, and where the first contact surface helps to prevent the rear portion of the insert from raising up during use.

2. The insert of claim 1, where the first contact surface is a first contact ledge.

3. The insert of claim 1, where the insert includes a second threaded bore in the underside of the rear portion, and a second retainer, where the second retainer has a threaded shaft with two ends, where one of the two ends is threaded into the second threaded bore, where the other of the two ends has a second head, where the second head has a laterally projecting second contact surface, where the second contact surface is positioned to extend under and thereby overlap at least a part of the table saw under the rear portion of the insert when the insert is installed in the table saw, where the second contact surface extends under the table saw without the second retainer having to be rotated when the insert is installed in the table saw, and where the second contact surface helps to prevent the rear portion of the insert from raising up during use.

4. The insert of claim 3, where the second contact surface is a second contact ledge.

5. The insert of claim 3, where the main body has a right side, a left side, a front portion connecting the right and left sides, and a region between the right and left sides through which a blade may extend, and where the first contact surface is on one of the right and left sides and the second contact surface is on the other of the right and left sides.

6. The insert of claim 5, where the first and second contact surfaces are contact ledges.

7. The insert of claim 3, where the main body has a right side, a left side, a front portion connecting the right and left sides, and a gap at the rear portion between the right and left sides, and where the first and second heads abut parts of the table saw when the insert is installed in the table saw to prevent the right and left sides from moving toward each other.

8. The insert of claim 1, where the main body has a right side, a left side, a front portion connecting the right and left sides, and a gap at the rear portion between the right and left sides.

9. The insert of claim 8, where the main body does not connect the right and left sides at the rear portion.

10. The insert of claim 8, where the main body has a region between the right and left sides through which a blade may extend.

11. The insert of claim 1, where the main body has a top surface, and where the insert further comprises at least one hole in the top surface through which the position of the first contact surface can be adjusted.

12. The insert of claim 1, where the first retainer can be threaded into the first threaded bore in selective amounts to adjust the height of the rear portion relative to the table when the insert is installed in the table saw.

13. An insert for use with a table saw, the insert comprising:
a main body having a rear portion, an underside, a perimeter, and a gap extending from the perimeter of the main body to divide the rear portion into first and second spaced-apart members;
a first contact surface positioned in the rear portion of the main body, on the first spaced-apart member, within the perimeter, and adjacent the underside;
a second contact surface positioned in the rear portion of the main body, on the second spaced-apart member, within the perimeter, and adjacent the underside;
where the first and second contact surfaces are positioned to extend under and thereby overlap parts of the table saw under the rear portion of the insert when the insert is installed in the table saw to prevent the first and second spaced-apart members from raising up during use.

14. The insert of claim 13, where the first and second contact surfaces maintain the first and second spaced-apart members apart when the insert is installed in the table saw.

15. The insert of claim 13, where the first and second contact surfaces are contact ledges.

16. The insert of claim 1, further comprising a screw threaded into a socket on the main body, where the screw has a head, and where the first contact surface is part of the head.

* * * * *